United States Patent
Tan et al.

(10) Patent No.: US 12,008,368 B2
(45) Date of Patent: Jun. 11, 2024

(54) PROGRAMMABLE COMPUTE ENGINE HAVING TRANSPOSE OPERATIONS

(71) Applicant: Amazon Technologies, Inc., Seattle, WA (US)

(72) Inventors: Xiaodan Tan, Mountain View, CA (US); Paul Gilbert Meyer, Jericho, VT (US); Sheng Xu, Santa Clara, CA (US); Ron Diamant, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/934,147

(22) Filed: Sep. 21, 2022

(65) Prior Publication Data

US 2024/0111528 A1   Apr. 4, 2024

(51) Int. Cl.
*G06F 9/30*   (2018.01)
*G06F 9/355*   (2018.01)

(52) U.S. Cl.
CPC ...... *G06F 9/30036* (2013.01); *G06F 9/30145* (2013.01); *G06F 9/3555* (2013.01)

(58) Field of Classification Search
CPC . G06F 9/30145; G06F 9/30036; G06F 9/3555
See application file for complete search history.

(56) References Cited

U.S. PATENT DOCUMENTS

| | | | |
|---|---|---|---|
| 6,654,730 B1 | 11/2003 | Kato et al. | |
| 6,757,284 B1 | 6/2004 | Galles | |
| 7,755,631 B1 | 7/2010 | Mrazek et al. | |
| 8,121,235 B1 | 2/2012 | Sun et al. | |
| 9,710,265 B1 | 7/2017 | Temam et al. | |
| 10,120,580 B2 | 11/2018 | Olcay | |
| 10,157,333 B1 | 12/2018 | Wang et al. | |
| 10,210,860 B1 | 2/2019 | Ward et al. | |
| 10,592,250 B1 | 3/2020 | Diamant et al. | |
| 11,182,337 B1 | 11/2021 | Maiyuran et al. | |
| 2004/0230784 A1 | 11/2004 | Cohen | |
| 2005/0273481 A1 | 12/2005 | Dent | |
| 2006/0095739 A1 | 5/2006 | Selvaggi et al. | |
| 2007/0073922 A1 | 3/2007 | Go et al. | |
| 2007/0240142 A1 | 10/2007 | Brokenshire et al. | |
| 2009/0119460 A1 | 5/2009 | Lin et al. | |
| 2009/0293048 A1 | 11/2009 | Chen et al. | |
| 2013/0258376 A1 | 10/2013 | Tsuchiya | |

(Continued)

OTHER PUBLICATIONS

U.S. Non-Final Office Action dated Jul. 17, 2023, in U.S. Appl. No. 17/447,677.

(Continued)

*Primary Examiner* — Zachary K Huson
(74) *Attorney, Agent, or Firm* — Weaver Austin Villeneuve & Sampson LLP

(57) ABSTRACT

A technique to execute transpose and compute operations may include retrieving a set of machine instructions from an instruction buffer of a data processor. The instruction buffer has multiple entries, and each entry stores one machine instruction. A machine instruction from the set of machine instructions is executed to transpose a submatrix of an input tensor and perform computations on column elements of the submatrix. The machine instruction combines the transpose operation with computational operations into a single machine instruction.

20 Claims, 16 Drawing Sheets

(56) References Cited

U.S. PATENT DOCUMENTS

| | | | |
|---|---|---|---|
| 2014/0317333 A1 | 10/2014 | Dorst et al. | |
| 2015/0277924 A1 | 10/2015 | Zappulla et al. | |
| 2018/0113006 A1 | 4/2018 | Tyrer | |
| 2018/0253877 A1 | 9/2018 | Kozub et al. | |
| 2019/0034785 A1 | 1/2019 | Murray et al. | |
| 2019/0266217 A1 | 8/2019 | Arakawa et al. | |
| 2020/0211189 A1 | 7/2020 | Yip et al. | |
| 2020/0342632 A1 | 10/2020 | Frumkin et al. | |
| 2020/0356837 A1 | 11/2020 | Hargil et al. | |
| 2022/0343137 A1* | 10/2022 | Surendran | G06N 3/063 |
| 2022/0405556 A1 | 12/2022 | Lichtenau et al. | |
| 2022/0414182 A1* | 12/2022 | Adelman | G06F 9/30036 |
| 2023/0019151 A1 | 1/2023 | Ahmadi et al. | |

OTHER PUBLICATIONS

Cook, J., "Accurately Computing Running Variance", John D. Cook Consulting [blog], Nov. 1, 2014, pp. 1-3, URL: https://www.johndcook.com/blog/standard_deviation/ [retrieved on Feb. 8, 2023].

Ioffe, S. et al., "Batch Normalization: Accelerating Deep Network Training by Reducing Internal Covariate Shift", 32nd International Conference on Machine Learning (ICML 15), Mar. 2, 2015, pp. 1-11, URL: https://arxiv.org/abs/1502.03167v3.

U.S. Non-Final Office Action dated Sep. 27, 2022 in U.S. Appl. No. 17/447,677.

U.S. Appl. No. 17/447,675, inventor Meyer, filed Sep. 14, 2021.

U.S. Appl. No. 17/447,677, inventor Meyer, filed Sep. 14, 2021.

U.S. Appl. No. 17/934,145, inventors Tan et al., filed Sep. 21, 2022.

U.S. Appl. No. 17/935,415, inventors Meyer et al., filed Sep. 26, 2022.

U.S. Appl. No. 17/935,419, inventors Meyer et al., filed Sep. 26, 2022.

U.S. Appl. No. 17/937,329, inventors Meyer et al., filed Sep. 30, 2022.

U.S. Appl. No. 17/937,333, inventors Meyer et al., filed Sep. 30, 2022.

U.S. Appl. No. 17/937,335, inventors Meyer et al., filed Sep. 30, 2022.

Wikipedia [webpage], "Algorithms for calculating variance", Mar. 24, 2001, pp. 1-14, URL: https://en.wikipedia.org/wiki/Algorithms_for_calculating_variance [retrieved on Feb. 8, 2023].

Stack Overflow, "Search max value and index inside Nested list", 2013, 3 pages, URL: https://stackoverflow.com/questions/18616793/search-max-value-and-index-inside-nested-list [retrieved on Feb. 27, 2023].

Stack Overflow, "How do I get indices of N maximum values in a NumPy array?", 2011, 16 pages, URL: https://stackoverflow.com/questions/6910641/how-do-i-get-indices-of-n-maximum-values-in-a-numpy-array [retrieved on Feb. 28, 2023].

U.S. Final Office Action dated Mar. 9, 2023 in U.S. Appl. No. 17/447,677.

International Search Report and Written Opinion dated Nov. 2, 2023 in PCT Application No. PCT/US2023/073800.

U.S. Final Office Action dated Dec. 26, 2023 in U.S. Appl. No. 17/447,677.

U.S. Restriction Requirement dated Sep. 28, 2023, in U.S. Appl. No. 17/937,333.

* cited by examiner

PROGRAMMABLE COMPUTE ENGINE HAVING TRANSPOSE OPERATIONS

BACKGROUND

Machine learning utilizes neural network computational models to perform complex tasks such as image recognition, natural language processing, among others. A neural network can involve various computations such as matrix multiplication operations, activation operations, pooling operations, etc. Neural networks can be executed on specialized hardware accelerator having circuitry tailored to perform such neural network computations.

BRIEF DESCRIPTION OF THE DRAWINGS

Various embodiments in accordance with the present disclosure will be described with reference to the drawings, in which.

DETAILED DESCRIPTION

Figure 1:
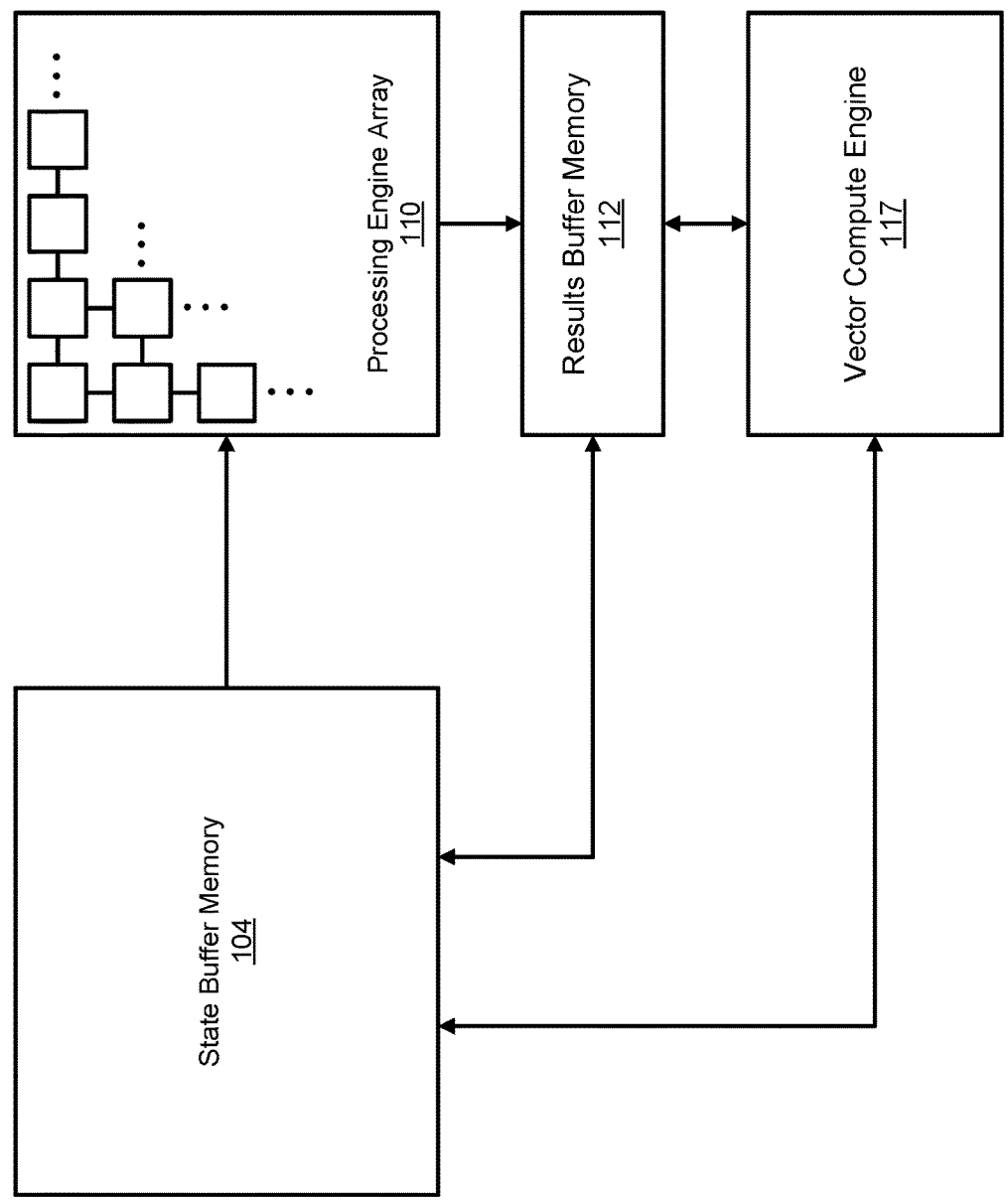
FIG. 1 illustrates a simplified block diagram of an example of an accelerator.

Machine learning workloads typically operate on large amounts of matrix computations. The computational results can be stored in the hardware according to a certain data layout (e.g., a 2-dimensional tensor stored as row-major or column-major in a buffer memory across multiple memory partitions). If the computational result is consumed by a subsequent computation, and the data layout of the computational result is not arranged in the buffer memory in a manner compatible with the subsequent computation, a data layout conflict is encountered. In such scenarios, certain data rearrangement operations can be used to reorganize the data for the subsequent computation. For example, if the subsequent computation operates on column elements of a tensor stored in the buffer memory, but the compute engine performing the subsequent computation reads data along the row partitions of the buffer memory, a transpose operation can be used to rearrange the data such that the column elements are placed along row partitions for the compute engine.

To transpose a tensor stored in the buffer memory, the tensor can be fed into a processing engine array (e.g., a systolic array) that is typically used for matrix multiplication operations. The processing engine array can perform a matrix multiplication of the tensor with an identity matrix, and the multiplication result can be written back into the buffer memory as a transposed version of the original tensor. However, a significant portion of computations in a neural network involve performing matrix multiplications on data such as multiplying feature map tensors with weight tensors. Using the processing engine array to transpose a tensor takes away processing cycles from the processing engine array that can otherwise be used for meaningful computations. Performing transpose operations with the processing engine array also introduces latencies to read the tensor data from the buffer memory and write the transposed tensor back to the buffer memory.

The techniques disclosed herein offload the transpose operations from the processing engine array by providing transpose circuitry that a compute engine can use to transpose a tensor without involving the processing engine array. The transpose circuitry can be arranged along the datapath between the buffer memory storing the tensor and the compute engine such that the tensor can be transposed before the tensor data is processed by the compute engine. The transpose circuitry can include a bypass mode of operation such that the tensor being inputted into the compute engine can be selectively transposed depending on the operation being performed on the tensor. By integrating the transpose circuitry with the compute engine's datapath, a single machine instruction that combines the transpose operation with computational operations of the compute engine can be implemented to reduce the processing overhead. Integrating the transpose circuitry with the compute engine's datapath also eliminates the need to allocate buffer memory to store the intermediate transposed tensor. This can improve memory utilization, and avoid memory spill and fill operations that may otherwise be needed to accommodate the intermediate transposed tensor.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a simplified hardware architecture of a neural network accelerator 100 (e.g., a neural network processor). Neural network accelerator 100 includes a processing engine (PE) array 110, a state buffer memory 104, and a results buffer memory 112. State buffer 104 is an on-chip memory that acts as a cache for PE array 110. PE array 110 includes processing engines arranged in rows and columns, and is the main compute engine of neural network accelerator 100. PE array 110 can include m×n number of processing engines. Each processing engine may include a multiplier circuit and an adder circuit to perform a multiply-and-add operation. In some implementations, PE array 110 can support tiling to concurrently perform multiple matrix multiplication operations concurrently in the array. In some implementations, PE array 110 can be a 128×128 array (m=n=128). For ease of explanation, certain aspects of the present disclosure may be described with reference to a 128×128 PE array 110. However, it should be understood that PE array 110 may include other number of rows and/or columns, and that the number of rows can be different than the number of columns.

During operation, data such as feature map and/or weight values are shifted horizontally along the row direction into PE array 110 from state buffer 104. The multiplication results are accumulated vertically and written along the column direction into a result buffer memory 112 (may also be referred to as a partial sum (PSUM) buffer). The accumulated results can be written back to the state buffer memory 104 from the results buffer memory 112, and be used as inputs for subsequent computations. State buffer memory 104 can include the same number of row partitions as the number of rows in PE array 110. Each row of state buffer memory 104 may load data into one row of the PE array 110. In the example shown, if the PE array 110 has 128 rows (m=128), then the state buffer memory 104 may include m=128 number of row partitions. Because each row partition of state buffer memory 104 feeds into a corresponding row in PE array 110 (e.g., row partition 0 feeds into row 0 of PE array, row partition 1 feeds into row 1 of PE array, etc.), a tensor that is subject to a matrix multiplication computation to be performed in PE array 110 will have data elements spanning across multiple row partitions of state buffer 104, and across multiple memory locations within each row partition of the multiple row partitions.

In addition to PE array 110, neural network accelerator 100 may include other compute engines that access and process data from state buffer 104, such as a vector compute engine 117 to perform other types of computations. Neural network accelerator 100 may also include other types of compute engine not specifically shown such as an activation engine and/or pooling engine. Vector compute engine 117 may read data from the row partitions of state buffer memory 104, and may include the same number of compute channels as the number of row partitions. For example, if there are 128 row partitions in state buffer memory 104, vector compute engine 117 may include 128 compute channels such that the data from each row partition can be processed by a corresponding compute channel. The data being inputted to a compute channel may correspond to a vector of a tensor stored in state buffer memory 104. By having multiple compute channels, vector compute engine 117 can process multiple vectors of a tensor in parallel.

A compute channel may perform certain computations on the data elements read from state buffer memory 104. For example, the compute channel may count the number of data elements being streamed into the compute channel, calculate a mean and/or a variance of the data elements, and write back the count, mean, and/or variance values to the corresponding row partition of state buffer memory 104. Such computations can be used to perform tensor normalize or tensor reduction. A compute channel may also scale and/or offset each data element being streamed into the compute channel, and write back the modified data elements to the corresponding row partition of state buffer memory 104. Other types of computations that a compute channel may perform can include finding the maximum/minimum value, and/or sorting the data elements in ascending/descending order before writing back the data elements to the corresponding row partition of state buffer memory 104.

Matrix multiplication operations make up a significant part of neural network operations. As such, tensors are typically stored in a data layout format in state buffer memory 104 that is compatible with performing a matrix multiplication on the tensor using PE array 110. However, certain neural network operators may require a different data layout of the tensor. For example, a LayerNorm operator normalizes a tensor across activations at a layer of the neural network. To perform the LayerNorm operation, the mean and variance are computed across data elements stored in the column direction of state buffer memory 104. Thus, in order to prepare the data for vector compute engine 117 to calculate the mean and variance, the tensor sored in state buffer memory 104 is transposed to rearrange the data elements such that the column elements of a column are placed along a row partition of state buffer memory 104.

One way to perform the transpose operation is to copy the tensor to system memory (e.g., DRAM), and then write back the data elements into their transposed position in state buffer memory 104. However, accessing off-chip system memory may incur significant latencies. To perform the transpose operation within neural network accelerator 100, the tensor can be loaded into PE array 110 as weight values, and the tensor can be multiplied with an identity matrix. The resulting matrix multiplication result is written back into state buffer memory 104 as a transposed version of the original tensor. While such a transpose operation can be performed much faster than accessing system memory, transposing a tensor via PE array 110 still requires a round trip delay of reading from and writing back to state buffer memory 104 before the subsequent computations on the transposed tensor can begin. The transpose operation also takes up processing cycles in the PE array 110 that could have otherwise been used for actual data computations. Furthermore, after the computations are complete, another transpose operation may be needed to revert the tensor elements back into their original tensor arrangement to prepare the data for subsequent matrix multiplication operations.

Figure 2:
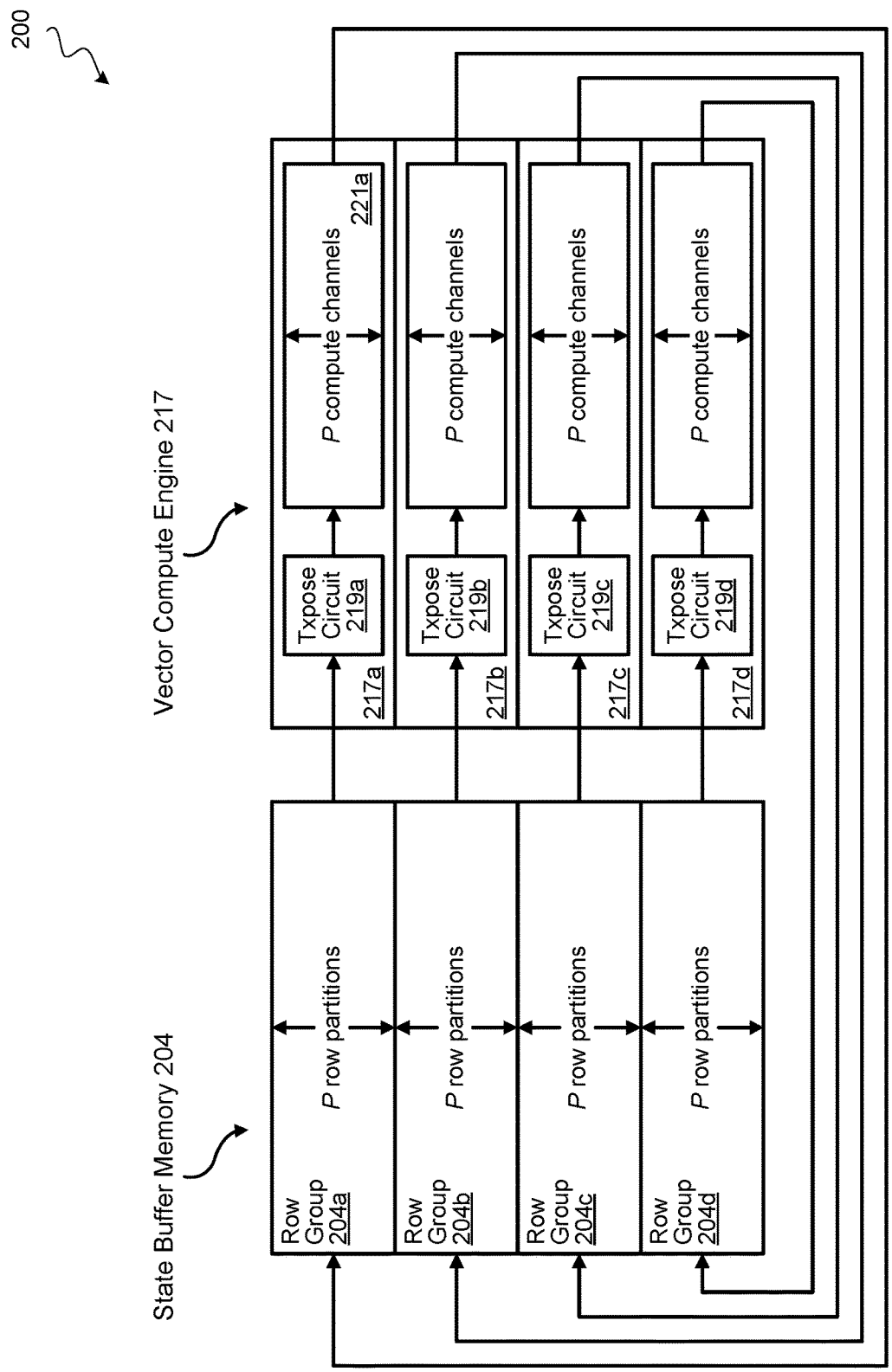
FIG. 2 illustrates a simplified block diagram of an example of an accelerator with transpose circuitry.

FIG. 2 illustrates a block diagram of an example of a portion of a neural network accelerator 200 having transpose circuitry to offload transpose operations from a PE array. Neural network accelerator 200 incudes a state buffer memory 204 and a vector compute engine 217. Although certain components such as the PE array itself and the results buffer memory have been omitted from FIG. 2, it should be understood that neural network accelerator 200 may include these components as well as other components not specifically shown. The components of neural network accelerator 200 can be implemented on a single semiconductor die or in a single chip package.

State buffer memory 204 may include multiple row partitions organized into row groups. In the example shown, state buffer memory 204 has four row groups 204a to 204d, and each of the row groups includes P number of row partitions. Hence, if state buffer memory 204 has m=128 row partitions, each row group may have 32 row partitions. Although state buffer memory 204 is shown to have the same number of row partitions per row group, in some implementations, different row groups may include different number of row partitions. Furthermore, state buffer memory 204 may include a different number of row groups.

Similar to neural network accelerator 100, state buffer memory 204 acts as a cache to store tensors or matrices for a PE array (not shown) to process. The data stored in state buffer memory 204 can include input data, feature maps, weight tensors, intermediate results of in-progress computations, etc. The PE array can load matrices from the row partitions of state buffer memory 204 and perform matrix multiplication computations on the matrices. In some implementations, the PE array can support tiling to perform independent matrix multiplications on matrices obtained from different row groups. The results of the matrix multiplication computations can be stored and accumulated in a result buffer memory (not shown). The accumulated results can be written back to state buffer memory 204 for subsequent processing.

Vector compute engine 217 is an example of an integrated circuit device that can perform vectorized computations. Vector compute engine 217 may include multiple vector compute banks 217a to 217d coupled to respective row groups 204a to 204d of state buffer memory 204. Hence, each vector compute bank processes data from a corresponding row group. As shown in FIG. 2, the output of each vector compute bank can be written back to the corresponding row group of state buffer memory 204. Each of the vector compute banks 217a to 217d can be configured independently from each other to process data from their respective row groups 204a to 204d. Vector compute banks 217a to 217d (or a subset thereof) may also operate collectively to process data from a tensor that spans multiple row groups. It should be noted that although not shown in FIG. 2, vector compute engine 217 can also process data inputted from the results buffer memory.

Each vector compute bank includes a transpose circuit and multiple compute channels coupled to the transpose circuit. For example, vector compute bank 217a includes a transpose circuit 219a coupled to a set of compute channels 221a, vector compute bank 217b includes a transpose circuit 219b coupled to a set of compute channels 221b, and so on. Each vector compute bank may contain the same number of compute channels as the number of row partitions in the corresponding row group. Hence, if there are P number of row partitions in a row group, the corresponding vector compute bank may have P number of compute channels. The output of each compute channel can be written back to a corresponding row partition.

Referring to vector compute bank 217a, transpose circuit 219a can transpose submatrices (e.g., matrices spanning up to P row partitions) obtained from row group 204a, and provide the transposed submatrices to compute channels 221a. Each submatrix provided to transpose circuit 219a can be considered an input tensor for the transpose circuit 219a. Hence, transpose circuit 219a is operable to receive an input tensor, transpose the input tensor, and output the transposed tensor to compute channels 221a. Transpose circuit 219a may also include a bypass mode of operation in which the input tensor is provided to compute channels 211a as is, without transposing the data elements.

Each compute channel in compute channels 211a can operate in parallel and can perform computations to generate outputs in parallel. Each of the parallel outputs generated by compute channels 211a can be generated from a corresponding vector of the tensor (e.g., transposed tensor) inputted into vector compute bank 217a. Hence, compute channels 211a are operable to perform vector computations on transposed submatrices outputted from transpose circuit 219a.

In some implementations, the output generated from a compute channel can be an output vector generated by applying an elementwise operation to each element of the vector of the tensor (e.g., transposed tensor) inputted into the compute channel. In other words, when a vector of T elements is streamed into a compute channel, the compute channel may output T number of elements processed by the compute engine. Such operation can be used, for example, to scale and/or apply an offset to each of the data elements streamed into the compute engine. The output of a compute channel can also be an output value generated by performing one or more computations on the elements of the vector of the tensor (e.g., transposed tensor) inputted into the compute channel. For example, the output value can be the mean computed over the elements streamed into the compute channel, and/or the variance computed over the elements streamed into the compute channel. In some implementations, the compute channel may output the mean, variance, and count of the elements inputted into the compute channel from a single pass of the elements steamed into the compute channel.

Each of the vector compute banks 217a to 217d may operate in a similar manner. When all four transpose circuits 219a to 219d are operating together in parallel, vector compute engine 217 can perform the same transpose operation as the PE array (e.g., transpose a matrix spanning all row partitions of state buffer memory 204). Hence, vector compute engine 217 can be used to offload transpose operations from the PE array. By offloading the transpose operations, the PE array can be freed up to perform matrix multiplication computations concurrently with transpose operations being performed by the transpose circuits. In addition to freeing up the PE array, integrating the transpose circuitry into the datapath of vector compute engine 217 also reduces the computation latencies of processing the transposed tensors. As mentioned above, performing the transpose operations in the PE array incurs the latency of reading the tensor from the state buffer memory and writing the transposed tensor back to the state buffer memory. Thereafter, the transposed tensor can be streamed into vector compute engine 217 for processing. In contrast to performing the transpose operation in the PE array, the latency of writing back the transposed tensor into the state buffer memory can be eliminated altogether, because the transposed tensor can be streamed into the compute channels of vector compute engine 217 directly without having to first write the transposed tensor back to the state buffer memory 204.

Figure 3:
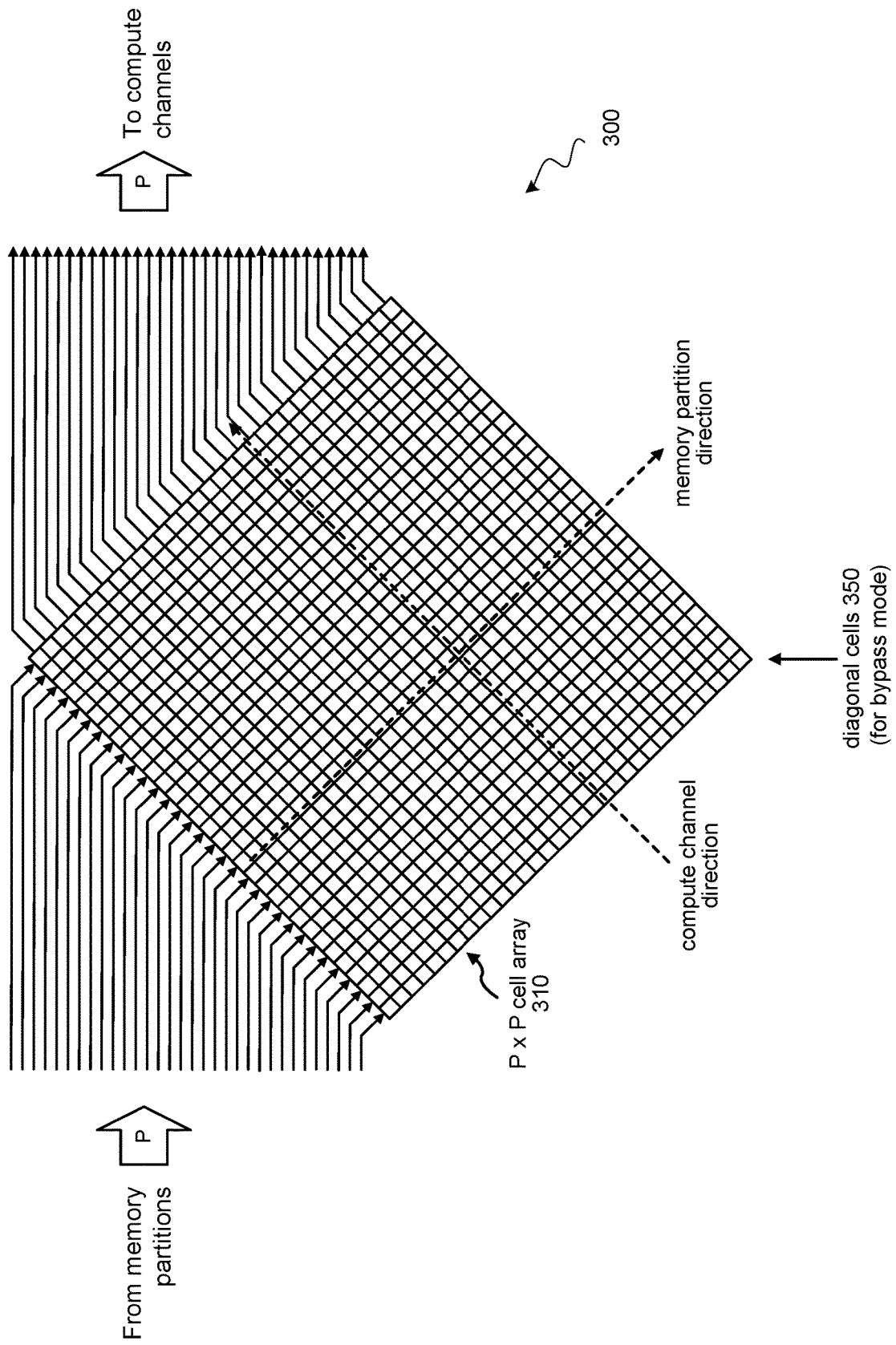
FIG. 3 illustrates a block diagram of an example of a transpose circuit.

FIG. 3 illustrates a block diagram of an example of a transpose circuit 300. Transpose circuit 300 can be used, for example, to implement any of transpose circuit 219a to 219d. Transpose circuit 300 may include a P×P cell array 310. In the example shown in FIG. 3, P=32, and transpose circuit 300 is a 32×32 cell array having 32 input lanes and 32 output lanes. However, it should be understood that the transpose circuit in other implementations may have other dimensions.

Each cell in cell array 310 is a storage element for storing a tensor element. For example, each cell can be a 32-bit storage element (e.g., 32-bit flip-flop) to store a 32-bit value. Transpose circuit 300 can receive 32 elements of input data in parallel at each cycle from respective memory partitions of a buffer memory. Each of the 32 elements can be a 32-bit value. The data can be inputted, for example, from row partitions of a state buffer memory. In some implementations, the data can also be inputted from a results buffer memory.

Each input element being received from a memory partition on an input lane can be written to any one or more of the storage elements along the memory partition direction by selectively enabling the storage element(s) along the memory partition direction. Each output lane can selectively read one storage element from the storage elements along the compute channel direction. To transpose a tensor, the 32 input elements received in parallel in one cycle corresponding to column elements of a column of the input tensor can be written into the storage elements along one output lane corresponding a compute channel. The output lane can then read out each of the stored elements in series along the compute channel. Hence, the input elements corresponding to a column of the input tensor being received in parallel are provided in series to a compute channel as a vector of the transposed tensor. This process can be repeated for each compute channel, and can be performed in a staggered manner to achieve full utilization.

Transpose circuit 300 can also operate in a bypass mode in which the input elements received on the input lanes are provided on the output lanes without transposition. This can be achieved by writing each input element in the corresponding center diagonal cells 350, and having the output lanes read from the center diagonal cells 350. Hence, by having the bypass mode of operation, the compute channels can be compatible with both neural network operators that require transposition and neural network operators that do not require transposition of the data stored in the buffer memory.

Figure 4:
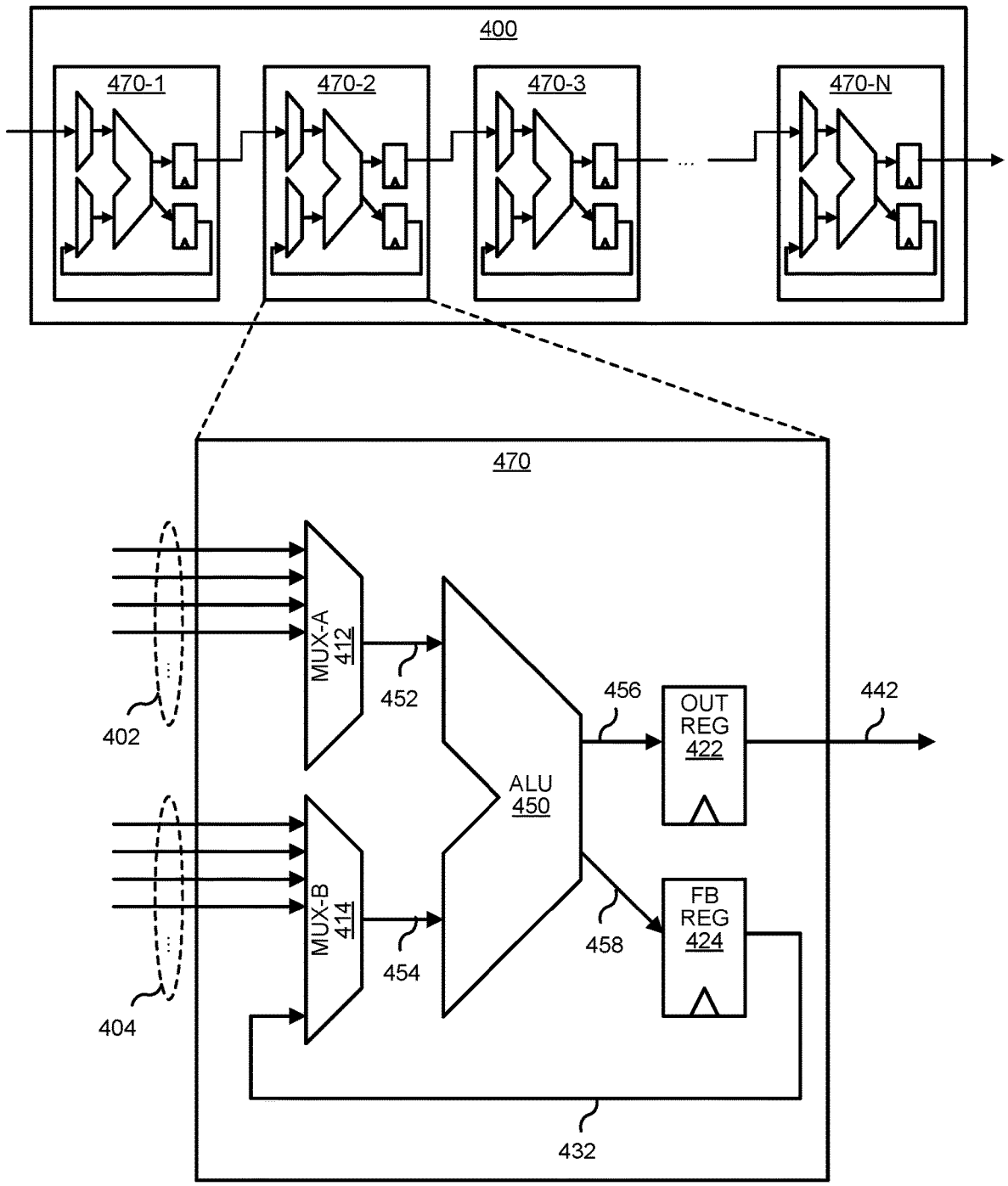
FIG. 4 illustrates a block diagram of an example of a compute channel.

FIG. 4 illustrates a block diagram of an example of a compute channel 400. Compute channel 400 can be, for example, one compute channel of the compute channels of a vector compute bank of vector compute engine 217. Compute channel 400 includes multiple computational circuit blocks 470-1 to 470-N coupled in series to form a pipeline. The number of computational circuit blocks N coupled in series can be four, eight, ten, sixteen, or other suitable number. Each computational circuit block in compute channel 400 can be implemented, for example, using computational circuit block 470. For ease of illustration, some of the details such as the selectable inputs to the multiplexers of computational circuit block 470 have been omitted from compute channel 400. It should be understood that each of computational circuit blocks 470-1 to 470-N in compute channel 400 may include additional inputs and/or other components not specifically shown.

Referring to computational circuit block 470, computation circuit block 470 includes an arithmetic logic unit (ALU) circuit 450. ALU circuit 450 includes a first numeric input 452, a second numeric input 454, a primary result output 456, and a secondary output 458. ALU circuit 450 is programmable to perform various arithmetic functions on first numeric input 452 and/or second numeric input 454 to generate primary result output 456.

For example, ALU circuit 450 can be programed to generate primary result output 456 by selecting an arithmetic function to perform on the numeric input(s) such as a passthrough function (or identity function) of first numeric input 452, bitwise inversion of first numeric input 452, left shift of first numeric input 452 by a number of bits indicated by second numeric input 454, right shift of first numeric input 452 by a number of bits indicated by second numeric input 454, addition of first numeric input 452 and second numeric input 454, subtraction of second numeric input 454 from first numeric input 452, multiplication of first numeric input 452 and second numeric input 454, division of first numeric input 452 by second numeric input 454, select the maximum (MAX) of first numeric input 452 and second numeric input 454, select the minimum (MIN) of first numeric input 452 and second numeric input 454, bitwise AND of first numeric input 452 and second numeric input 454, bitwise OR of first numeric input 452 and second numeric input 454, and/or bitwise XOR of first numeric input 452 and second numeric input 454, etc. In some implementations, ALU circuit 450 can be programmed to perform a matching operation on first numeric input 452 and second numeric input 454 to determine if first numeric input 452 matches second numeric input 454 (e.g., equal to each other), and to generate a match signal (not shown) indicating as such. It should be noted that depending the usage of ALU circuit 450, the computational logic within ALU circuit can be simplified to support fewer of the arithmetic functions described above. In some implementations, ALU circuit 450 can also support other arithmetic functions not specifically described.

Secondary output 458 can be used to loopback the first numeric input 452 or the second numeric input 454 back to the second numeric input 454 of ALU circuit 450. Thus, secondary output 458 can provide a feedback path 432 for ALU circuit 450 to retain a value that is being streamed into ALU circuit 450 (e.g., by storing the value in feedback register 424). This capability of ALU circuit 450 allows a computation pipeline composed of such ALU stages to retain a running computation, which can be used to compute, for example, a mean or a variance of any number of elements being streamed into the pipeline. This capability of ALU circuit 450 allows a computation pipeline to efficiently find and locate values in a tensor being streamed into the pipeline.

Computational circuit block 470 also includes a first multiplexer MUX-A 412 coupled to ALU circuit 450 to select the first numeric input 452 for ALU circuit 450, and a second multiplexer MUX-B 414 coupled to ALU circuit 450 to select the second numeric input 454 for ALU circuit 450. The set of inputs 402 selectable by multiplexer MUX-A 412 can be the same as or may overlap with the set of inputs 404 selectable by multiplexer MUX-B 414. The selectable inputs may include data stored at memory locations specified by the machine instruction being executed; one or more constant values specified by the machine instruction being executed or stored at a constant register; common values such as zero, one, a value representing positive infinity, a value representing negative infinity, etc. In some implementations, the selectable inputs may also include the primary result output of the ALU circuit 450 being feedback to itself, and/or one or more primary result outputs of subsequent ALU stages to allow complex computations to be performed.

Computational circuit block 470 also includes an output register 422 configured to receive primary result output 456 of ALU circuit 450, and provide primary result output 456 of ALU circuit 450 as the output 442 of computational circuit block 470. By registering primary result output 456, pipeline stages of computational circuit block 470 can be coupled in series to create a computational pipeline in which input values are operated on at each clock cycle by an ALU stage, and the result is provided to the next ALU stage for further processing in the next clock cycle. Computational circuit block 470 also includes a feedback register 424 configured to receive the secondary output 458 of ALU circuit 450, and to feedback the secondary output 458 as an additional input to the second multiplexer MUX-B 414. It should be noted that in some implementations, the secondary output is not provided to the next ALU stage. As mentioned above, feedback register 424 can be used to store and retain a value being streamed into computational circuit block 470.

Referring to compute channel 400, each of computational circuit blocks 470-1 to 470-N includes an ALU circuit, and thus the pipeline in compute channel 400 can be considered as an ALU pipeline having multiple ALU stages coupled in series. Each of the ALU stage is programmable to perform an arithmetic function on the first numeric input and/or the second numeric input of the ALU stage to generate the primary result output. The primary result output is provided to the next ALU stage. For example, the primary result output of computational circuit block 470-1 can be provided as the first numeric input of computational circuit block 470-2. In some implementations, each ALU stage can be independently programmed such that some or all of the ALU stages perform a different arithmetic function. Likewise, each ALU stage in the pipeline can be programmed to perform the same arithmetic function. In some implementations, the specific arithmetic function programmed into each ALU stage can be dependent on the particular machine instruction being executed by the compute channel 400.

As mentioned above, LayerNorm is one example of a neural network operator that may utilize transpose operations when executed in a neural network accelerator. The implementation of the LayerNorm operator in a neural network accelerator having transpose circuitry (e.g., neural network accelerator 200) will be described below to illustrate the advantages of the transpose circuitry.

A neural network model can be written in a programming language such as TensorFlow, PyTorch, Transformer, etc. The description of the neural network model written in the programming language may include a LayerNorm operator, which normalizes a tensor across activations at a neural network layer. The LayerNorm operator can be represented as:

$$y = \frac{x - E[x]}{\sqrt{\text{var}[x] + \epsilon}} \times \gamma + \beta$$

in which x is the input feature vector, y is the output feature vector, E[x] is the mean of x, var[x] is the variance of x, $\epsilon$ is a fixed compile-time constant for numerical stability, and $\gamma$ and $\beta$ are learnable parameters of the neural network model. For the LayerNorm operator, the mean and variance are computed over column elements of the tensor stored in the state buffer memory. Without the transpose circuitry described herein, the LayerNorm operator may require transposing the input tensor via the PE array before computing the mean and variance, and then re-transposing the normalized tensor via the PE array to put the output tensor back into the original data layout. The number of required transpose operations in the PE array may further be exacerbated when the input tensor is a large tensor requiring multiple transpose passes through the PE array.

Figure 5:
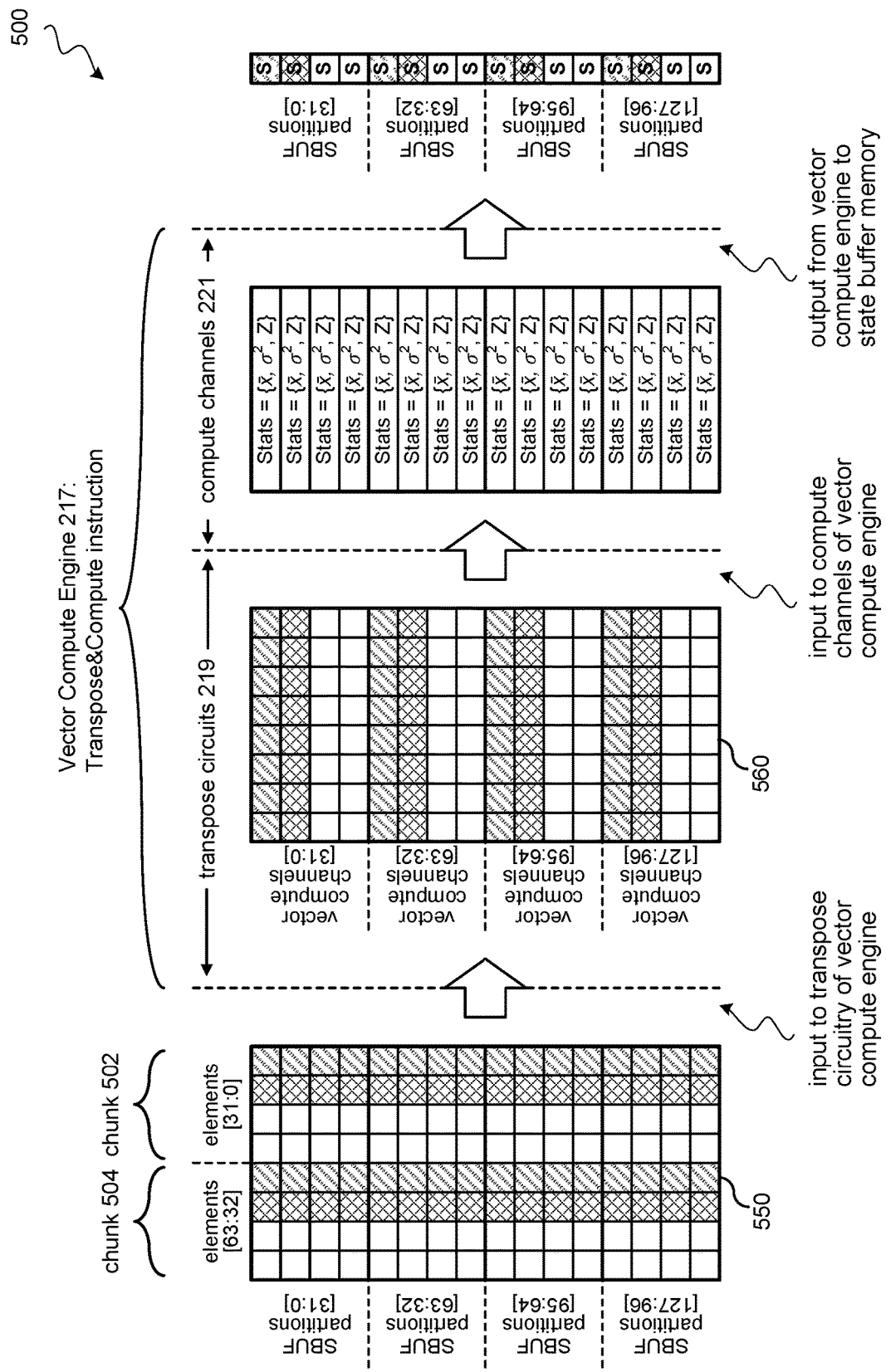
FIG. 5 illustrates a conceptual diagram of using a transpose circuit.

FIG. 5. Illustrates a conceptual diagram 500 of an example of performing a LayerNorm operation on a 256×32 tensor using neural network accelerator 200 having a state buffer memory with 128 row partitions and transpose circuits 219a-219d. To store tensor 550 having 256 rows and 32 columns of data elements in the state buffer memory (SBUF), tensor 550 can be split up into two data chunks of 128×32 data elements each. Data chunk 502 containing rows 0 to 127 of the original 256×32 tensor can be stored in the first 32 columns (column elements [31:0]) across the 128 row partitions of the state buffer memory, and data chunk 504 containing rows 128 to 255 can be wrapped around and stored in the next 32 columns (column elements [64:32]) across the 128 row partitions as shown (each "square" of tensor 550 represents 8×8 data elements). To highlight the data layout orientation in the state buffer memory, the first set of 8 columns (column 0 to 7) of the original 256×32 tensor is shown with the diagonal fill pattern, and the second set of 8 columns (columns 8 to 15) of the original 256×32 tensor is shown with the crosshatched fill pattern in FIG. 5. The remaining columns of the original tensor are not shown with a fill pattern, but it should be understood that the remaining columns of the original tensor are stored in columns [31:16] and columns [63:48] of the state buffer memory.

To compute the column mean and variance for the LayerNorm operation, the column elements may have to be transposed such that are aligned along a row partition to allow the column elements to be streamed into a compute channel of the vector compute engine 217. Vector compute engine 217 may include four vector compute banks. The first vector compute bank includes compute channels [31:0] that read data from state buffer partitions [31:0], the second vector compute bank includes compute channels [63:32] that read data from state buffer partitions [63:32], the third vector compute bank includes compute channels [95:64] that read data from state buffer partitions [95:64], and the fourth vector compute bank includes compute channels [127:96] that read data from state buffer partitions [127:96].

Each vector compute bank may include a 32×32 transpose circuit 219. To align the column data of tensor 550 for the compute channels 211, the transpose circuit 219 of a vector compute bank can transpose each set of 32 parallel data elements being read from the corresponding 32 row partitions and align the 32 data elements along a compute channel. For example, referring to the first vector compute bank, the first set of 32 parallel data elements read from column [0] across state buffer row partitions [31:0] of the state buffer memory can be rearranged and aligned along compute channel [0]. The second set of 32 parallel data elements read from column [1] across state buffer row partitions [31:0] can be rearranged and aligned along compute channel [1], and so on. When the set of 32 parallel data elements are read from column across state buffer row partitions [31:0], these data elements are realigned back on compute channel [0]. Column is realigned on compute channel [1], and so on. Conceptually, the vector compute bank transposes each 32×32 data elements streamed from the corresponding 32 state buffer memory partitions to align the column elements of each column to one of the 32 compute channels of the vector compute bank.

When tensor 550 arranged in the state buffe memory as shown is inputted into the transpose circuits 219 of vector compute engine 217, the resulting transposed tensor 560 generated by the transpose circuits 219 will have the column elements rearranged into rows such that the data elements being streamed into a corresponding compute channel 221 belong to the same column. By way of example, column 0 of the original 256×32 tensor, which is stored in columns [0] and in state buffer memory are transposed by the transpose circuit 219 such that the column elements are aligned along compute channel [0], [32], [64], and in the transposed tensor 560. Similarly, column 1 of the original 256×32 tensor, which is stored in columns [1] and in state buffer memory are transposed by the transpose circuit 219 such that the column elements are aligned along compute channel [1], [33], [65], and in the transposed tensor 560. Hence, each column of the original 256×32 tensor is now split across four rows in the transposed tensor 560 with one row in each of the four vector compute banks as shown. It should be noted that the transposed circuit 219 of each vector compute bank may store only 32×32 data elements at a time, and that the transposed data elements can be streamed into the corresponding compute channels 221 while other data of the original tensor are still being read from the state buffer memory and/or being transposed.

Each of the compute channels 221 of the vector compute engine 217 can be configured to compute statistics or perform other computations on the data elements being streamed into the corresponding compute channel. For the LayerNorm operator, the compute channels 221 can be configured to compute the mean, variance, and count of the data elements. In some implementations, the mean, variance, and count of data elements can be computed via one pass of the data elements through the ALU stages of the compute channel. For the LayerNorm operator, the output of each compute channel 221 is a set of statistics S including the mean, variance, and count of a row of data elements of transposed tensor 560. The output of each compute channel 221 is written back to the row partition of the state buffer memory corresponding to the compute channel.

In addition to offloading the transpose operations from the PE array, another advantage of having the transpose circuits 219 is that a single machine instruction can be used to configure a vector compute bank to perform both the transpose operation and computational operations. For example, the instruction set of the vector compute engine can be extended by one bit to indicate whether the inputs to a vector compute bank should be transposed prior to performing the computations corresponding to the instruction. Hence, any instruction of the vector compute engine can be extended to a Transpose&Compute instruction that can be executed by a vector compute bank to perform both transpose and compute operations. For example, the aforementioned statistics of mean, variance, and count of a stream of data elements can be computed by executing a BatchNormStats instruction. The instruction set of the vector compute engine can be extended to include a TransposeBatchNormStats instruction, which when executed by a vector compute bank, will transpose an input tensor and compute the mean, variance, and count of the transposed data elements.

It should be noted that in some implementations, a single instruction can be used to program all vector compute banks of the compute engine to perform the same operation. A single instruction can also be used to program a subset of the vector compute banks to perform the same operations. Each vector compute bank can also be independently configurable, and each vector compute bank can be programmed by its own instruction to allow the vector compute banks to perform different operations in parallel.

As explained above, the column elements of a column of the original 256×32 tensor are split along four rows of the transposed tensor 560. It follows then that the computations for one column of the original 256×32 tensor are also split across four compute channels, and the resulting statistics outputted by the vector compute engine 217 are stored in four row partitions in the state buffer memory. For example, the statistics for column 0 of the original 256×32 tensor are split and stored in row partitions [0], [32], [64], and in the state buffer memory. Hence, in order to obtain the mean and variance of one column of the original tensor for the LayerNorm operation, the statistics split across the four row partitions are aggregated.

Figure 6:
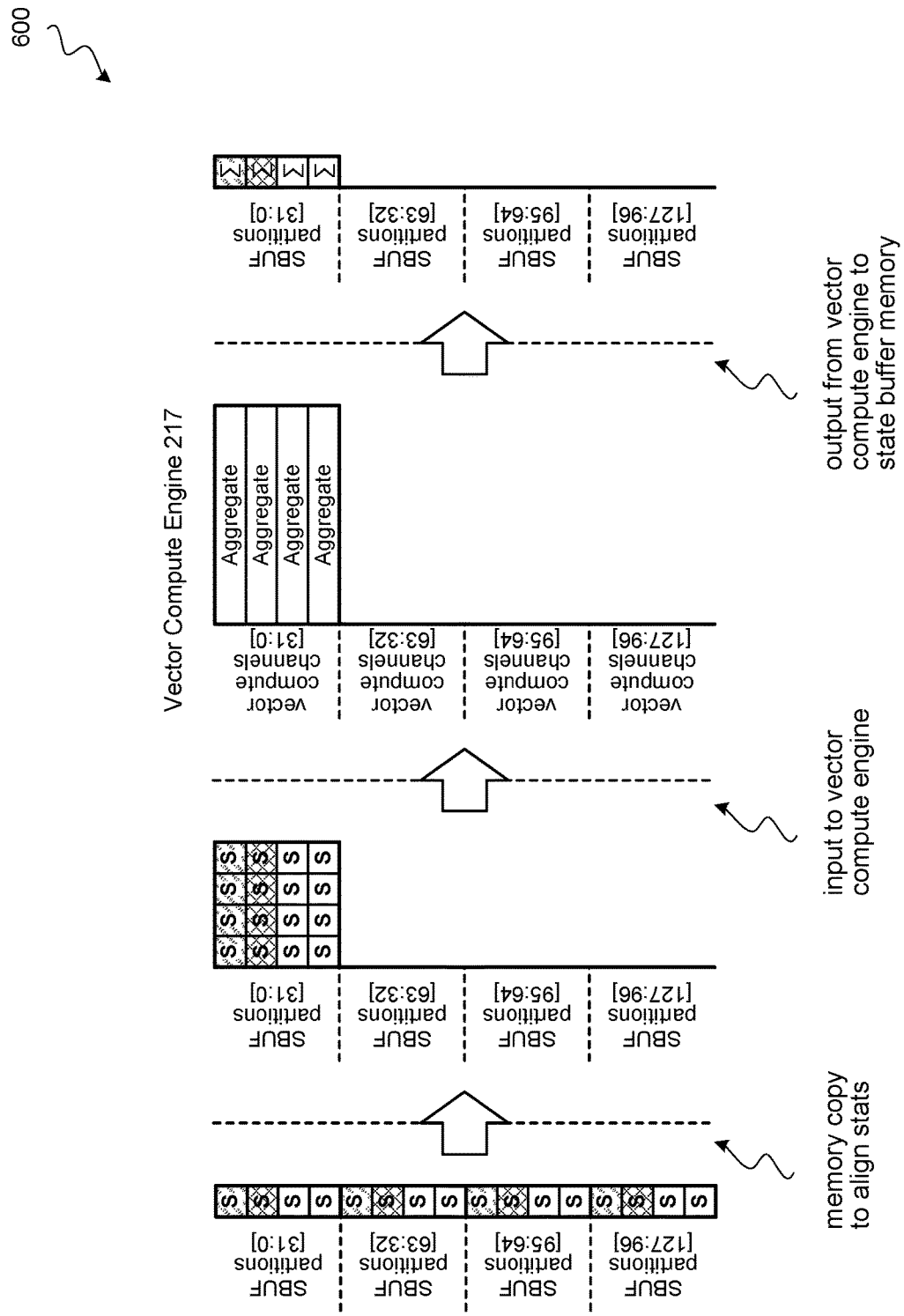
FIG. 6 illustrates a conceptual diagram of aggregating computational results.

FIG. 6 illustrates a conceptual diagram 600 of an example of aggregating the computational results of the vector compute engine for a LayerNorm operation on a 256×32 tensor. As mentioned above, after the transposed tensor 560 has been streamed into the compute channels 221 of the vector compute engine 217, the statistics of each column of the original 256×32 tensor are stored in four row partitions of the state buffer memory (one row partition in each quadrant). To aggregate the statistics belonging to one column of the original 256×32 tensor, memory copy operations can be performed to copy the statistics into the same row partition. By way of example, the partial statistics of column 0 of the original 256×32 tensor stored in row partitions [32], [64], and can be copied to row partition [0] as shown. Once the statistics (e.g., mean, variance, count) for each column of the original 256×32 tensor are aligned on respective row partitions, the statistics can be streamed into the vector compute engine 217 to perform an aggregate operation. For the aggregate operation, the transpose circuits of vector compute engine 217 can be set in the bypass mode of operation. The output of the vector compute engine 217 is a single set of statistics E (e.g., mean, variance, and count) for each column of the original 256×32 tensor. The outputs of the vector compute engine 217 are written back to the corresponding row partitions of the state buffer memory. As shown in FIG. 6, only one vector compute bank or only compute channels [31:0] are used for the aggregate operation. This is because the original 256×32 tensor has only 32 columns, and there are only 32 means/variances to compute.

Once the mean and variance of each column of the original tensor has been obtained, the square root of the variances can be computed by an activation engine. The remaining computations of the LayerNorm operator to normalize the data elements of the original tensor can be performed by streaming the original tensor into the vector compute engine 217, and programming the vector compute engine to perform the appropriate scaling and offset operations on each data element to generate the normalized output tensor.

Figure 7:
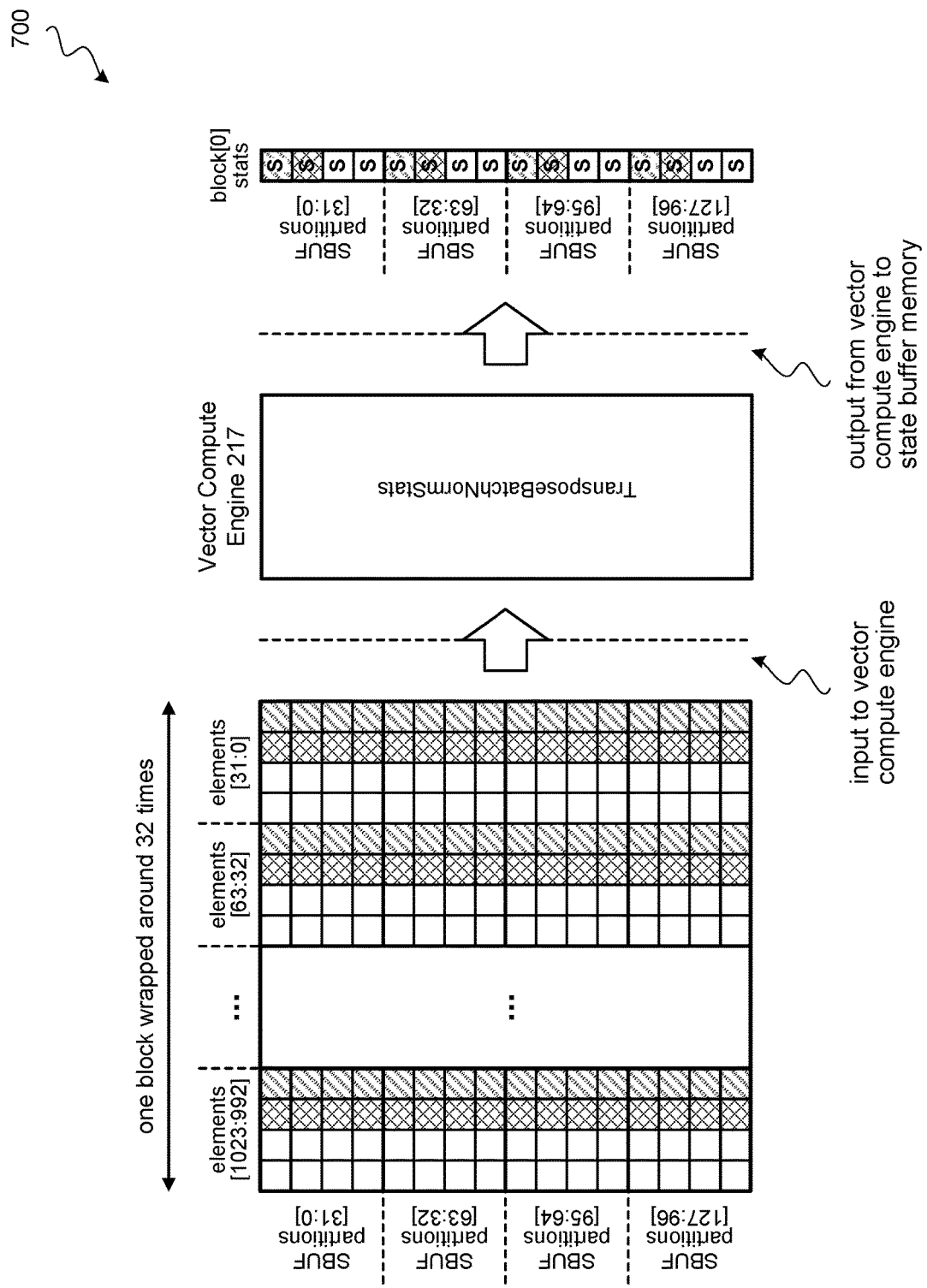
FIG. 7 illustrates a conceptual diagram of using a transpose circuit with a large tensor.

The LayerNorm operator described above can be extended to larger tensors to fully utilize the vector compute engine during the aggregation operations. For example, when performing the LayerNorm operator on a 4096×2048 tensor, the 4096×2048 tensor can be split into 64 blocks of 4096×32 data elements each, with each block yielding 32 means and variances (one set per column). FIG. 7 illustrates a conceptual diagram 700 of the initial processing of one block of 4096×32 data elements. The block of 4096×32 data elements can be stored in the state buffer memory by wrapping the block around 32 times over the 128 row partitions of the state buffer memory (4096 rows/128 row partitions=32). Hence, one block of 4096×32 data elements can be stored in columns [1023:0] of the 128 row partitions of the state buffer memory.

Computation of the statistics for the block of 4096×32 data elements can be carried out in a similar manner to the 256×32 tensor described above with reference to FIG. 5. Each vector compute bank of the vector compute engine 217 can be programmed to execute the TransposeBacthNormStats instruction to transpose each chunk of 32×32 data elements streamed into the corresponding vector compute bank and compute the mean, variance, and count of data elements along each compute channel. The output of the vector compute engine is a set of statistics for the 32 columns of the block of 4096×32 data elements, with the statistics for one column being split across four row partitions. Hence, the resulting statistics for the 32 columns of one block of 4096×32 data elements spans the 128 row partitions of the state buffer memory as shown. The same process can be repeated for each of the 64 blocks of 4096×32 data elements to generate 64 sets of statistics (one set of statistics per block, each set of statistics containing statistics for 32 columns), and each set of statistics for 32 columns is stored across the 128 row partitions in which the statics of one column are split into one row partition per quadrant.

Figure 8:
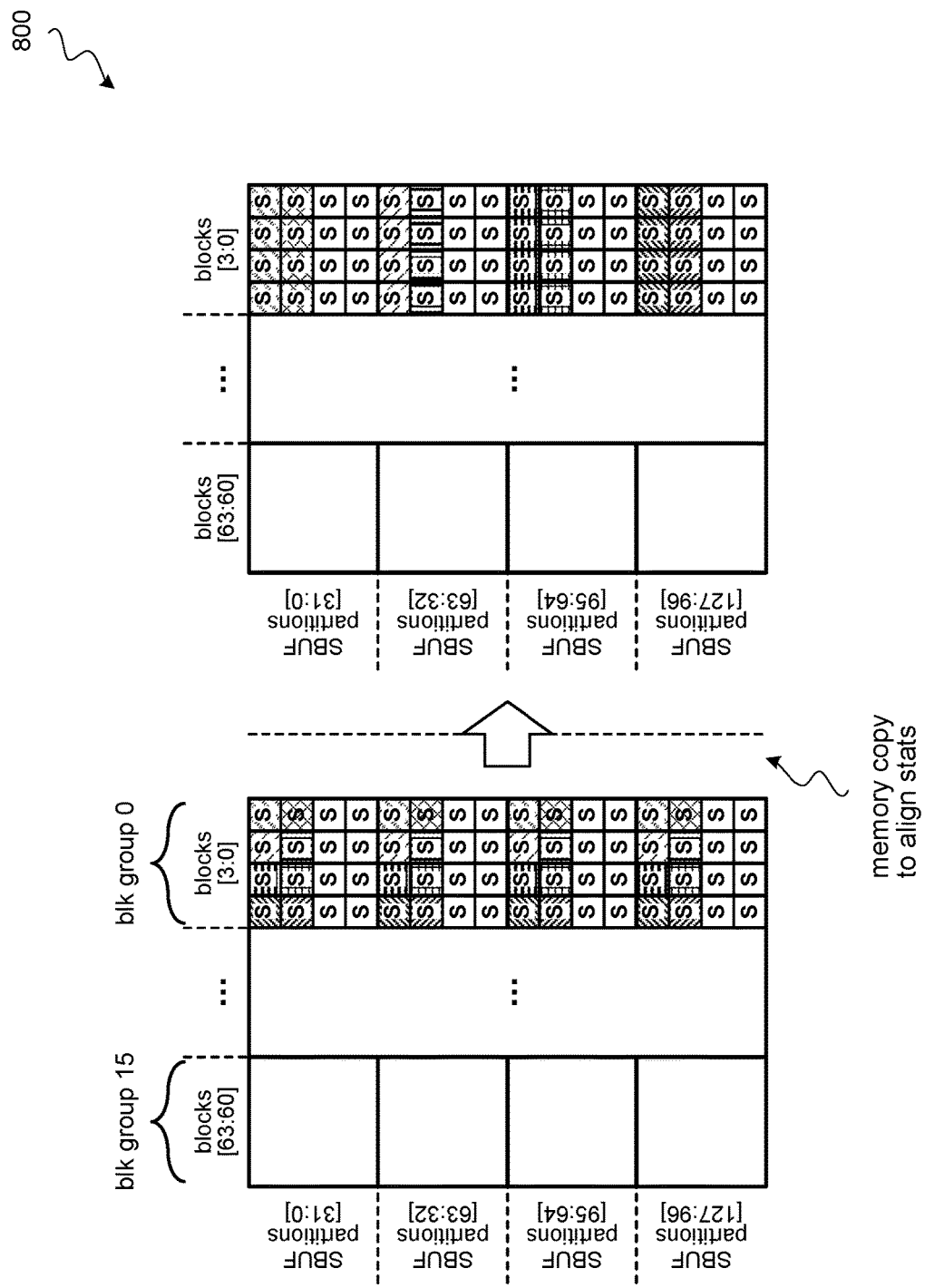
FIG. 8 illustrates a conceptual diagram of aggregating computational results on a large tensor.

FIG. 8 illustrates a conceptual diagram 800 of the resulting statistics for the 64 blocks of 4096×32 data elements being stored in the state buffer memory. The 64 blocks can be grouped into 16 block groups each containing 4 blocks. By grouping the blocks into block groups each containing 4 blocks, full utilization of the vector compute engine 217 can be achieved during the aggregate operations. The statistics of each block group of 4 blocks can be rearranged using memory copy operations to align the statistics for each column to be aligned along a compute channel of the vector compute engine. Each block group of 4 blocks contains the statistics for 4 blocks×32 columns=128 columns. Thus, the statistics of each of the 128 columns can be aligned along one of the 128 compute channels of the vector compute engine. Once the statistics of the 128 columns have been aligned along respective compute channels, the statistics can be streamed into the vector compute engine 217 to aggregate the statistics for each column. All 128 compute channels of the vector compute engine 217 can perform the aggregate operation in parallel to achieve full utilization of the vector compute engine 217.

An addition optimization can be achieved when performing the memory copy operations for the 64 blocks. The data movement to align the statistics of the 16 block groups can be performed in parallel. In other words, the memory copy operations for block group 0 can be performed in parallel with the memory copy operations for each of the other block groups 1 to 15. In other words, the data movement for aligning the statistics can be performed concurrently on all 16 block groups. This further reduces the number of machine instructions and separate memory copy operations needed to implement the LayerNorm operator.

Figure 9:
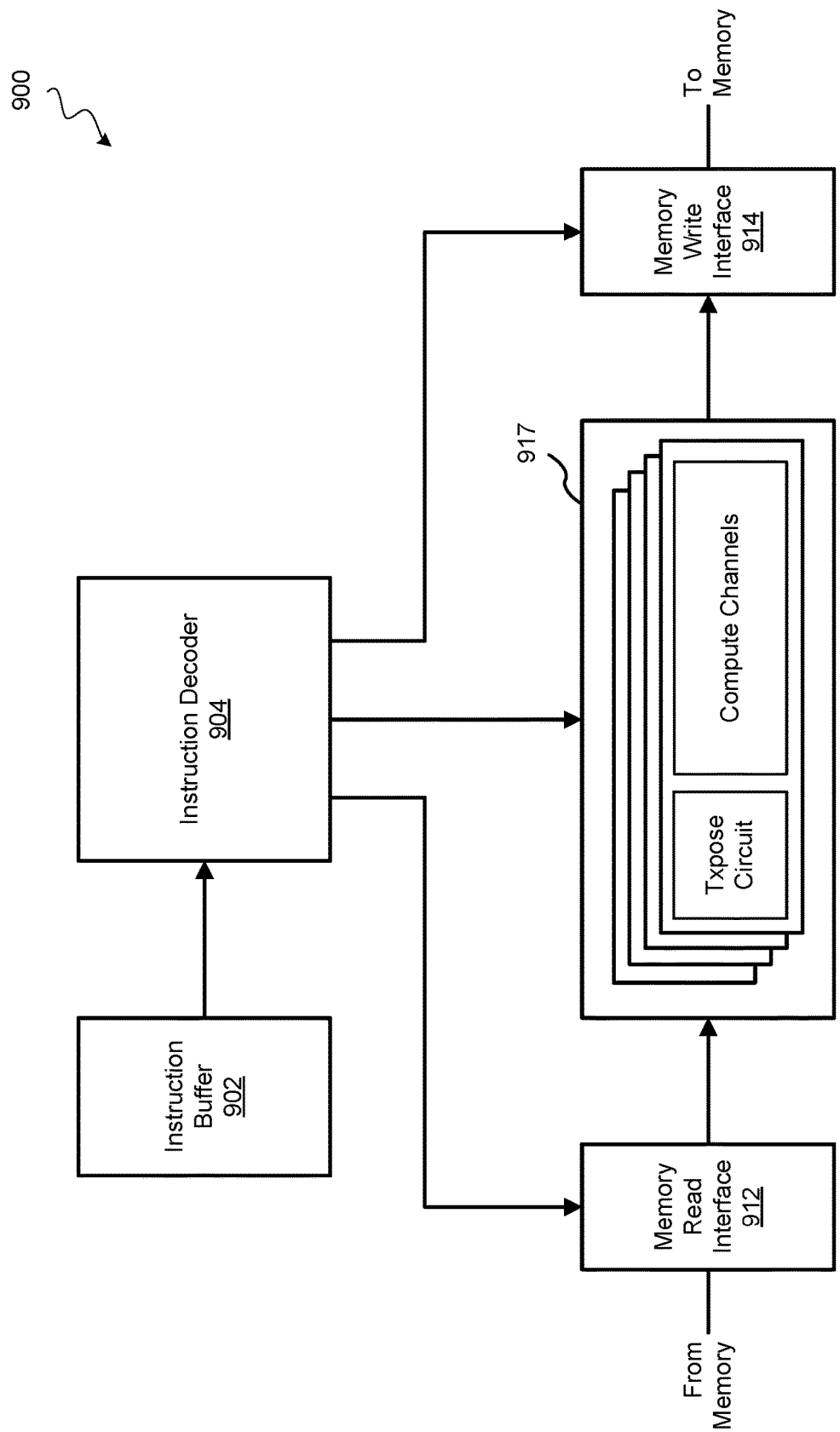
FIG. 9 illustrates a block diagram of an example of an execution engine.

FIG. 9 illustrates a block diagram of an example of an execution engine 900. Execution engine 900 can be part of a data processor (e.g., a data processing integrated circuit device such as a processor, a graphics processor, a digital signal processor, a tensor processor, a neural network accelerator, or other types of application specific integrated circuits). For example, execution engine 900 can be part of a neural network accelerator.

Execution engine 900 includes an instruction buffer 902, an instruction decoder 904, a memory read interface 912, a memory write interface 914, and a processing circuit 917. Instruction buffer 902 stores a set of pending machine instructions that are executable by execution engine 900 to perform certain functions or operations. Instruction buffer 902 may include a set of entries in which each entry stores a single machine instruction. The machine instructions can be, for example, assembly-type instructions and can be part of an instruction set for the data processor architecture. Examples of instruction sets may include ARM instruction set, MIPS instruction set, x86 instruction set, or other types of proprietary instruction set tailored for a certain data processor architecture.

Instruction decoder 904 is configured to retrieve or obtain a machine instruction from instruction buffer 902, and includes instruction decoder circuitry to decode the machine instruction to determine the actions to be taken by execution engine 900. For example, instruction decoder 904 may decode a machine instruction to extract various fields including an opcode, and one or more operands (depending on the opcode) to allow execution engine 900 to perform the intended operations. In some implementations, instruction decoder 904 may decode a complex instruction into multiple opcodes and corresponding optional operands. Instruction decoder 904 may also drop or discard unrecognizable or invalid instructions.

The fields extracted by instruction decoder 904 can be used to lookup configuration profiles to program or configure processing circuit 917 to perform certain functions. The extracted fields from the machine instruction may also identify locations in memory (e.g., which row partitions and which locations in the row partitions) to retrieve data for processing circuit 917 to process, and identify locations in memory (e.g., which row partitions and which locations in the row partitions) to write and store the results outputted from processing circuit 917. In some implementations, processing circuit 917 may interface with one or more memories via memory read interface 912 and memory write interface 914. Processing circuit 917 can be communicatively coupled between two memories, and may read from one memory and write to another, and/or read and write to the same memory. For example, in implementation in which processing circuit 917 is implemented using a vector compute engine as shown, processing circuit 917 may interface with a state buffer memory and a results buffer memory. Processing circuit 917 may obtain data to process from either or both of these buffer memories via memory read interface 912, and may write the output to either or both of these buffer memories via memory write interface 914.

In some implementations, processing circuit 917 can be implemented using a vector compute engine (e.g., vector compute engine 217) that includes multiple vector compute banks. Each vector compute bank may include a transpose circuit coupled to multiple compute channels to perform parallel data processing and provide vectorized computations. Each of the compute channels can be implemented with multiple computational circuit blocks coupled in series to form a pipeline. For example, in some implementations, a compute channel may include at least eight computational circuit blocks, and thus at least eight pipeline stages. Each of the computation circuit blocks includes a programmable ALU circuit that can be programmed to perform various functions depending on the machine instruction being executed by execution engine 900. The computation circuit block can be implemented, for example, using computational circuit block 470.

To facilitate programming of processing circuit 917, new machine instructions that combines the transpose operation with computational operations can be implemented. The machine instructions for processing circuit 917 can be implemented to include a transpose bit (e.g., add a new bit, or repurpose a previously unused bit). When the instruction decoder 904 decodes a machine instruction obtained from instruction buffer 902, if the transpose bit is set, the transpose circuit of processing circuit 917 can be configured to transpose input data elements (e.g., a submatrix of an input tensor), and the compute channels can perform computations of the instruction on column elements of the input data elements. If the transpose bit is not set, the transpose circuit can be configured in the bypass mode, and the input data can be streamed into the compute channels along a row orientation without transposition.

For example, processing circuit 917 may support a BacthNormStats instruction, which when executed, computes a set of statistics including a mean, variance, and/or count of the data elements being streamed into each compute channel. A transpose version of the instruction, TransposeBacthNormStats, can be implemented to combine the transpose operation with the statistics computations into a single machine instruction. When the TransposeBacthNormStats is executed, input data elements (e.g., submatrix of an input tensor) can be transposed by the transpose circuit, and the mean, variance, and/or count along the column elements of the input data can be computed. It should be understood that the BacthNormStats instruction is just one example of a machine instruction that can have a corresponding transpose version. Other machine instructions in the instruction set executable by processing circuit 917 to perform other types of computations can also have a corresponding transpose version to combine the transpose operation with the corresponding computational operations into a single machine instruction.

In implementations in which processing circuit 917 is implemented using vector compute engine 217 having multiple vector compute banks, each vector compute bank may execute an independent instruction, or some or all of the vector compute banks may execute the same instruction. For example, a vector compute bank may execute a first machine instruction to transpose a first submatrix of an input tensor and perform computations on column elements of the first submatrix. The same or different vector compute bank may execute a second machine instruction to transpose a second submatrix of the input tensor and perform computations on column elements of the second submatrix. Two vector compute banks can also concurrently execute a machine instruction that transposes and computes, and another machine instruction that does not involve a transpose operation. The vector compute banks can also operate together, and may execute the same machine instruction to perform the same type of operations (e.g., transpose and compute) on each of the submatrices of an input tensor to collectively process the input tensor. For example, a single instruction can be used to program all or a subset of the vector compute banks to perform the same operation on different submatrices of an input tensor.

In some implementations, the set of machine instructions loaded on the data processor can be generated by compiler. A compiler can be executed to compile a description of a neural network model that contains neural network operations into machine instructions. For example, the description of the neural network model can be written in a certain programming language. The compiler can identify a neural network operation in the description of the neural network model that has a data layout conflict with a previous neural network operation. For example, the neural network operator may perform computations on data elements of vectors stored across row partitions of a memory buffer by a previous operation (e.g., along columns of an tensor generated by a previous operation). A neural network operation may encounter data layout conflicts, because the operation may perform computations along column data elements using compute engines that read data along the row direction. The data layout conflict can be resolved by inserting a transpose operation. However, instead of inserting an individual transpose instruction (e.g., transpose using the PE array), a machine instruction that combines a transpose operation with computational operations can be generated to implement the neural network operation. The machine instruction can be executed by a compute engine to perform both the transpose and computational functions.

Figure 10:
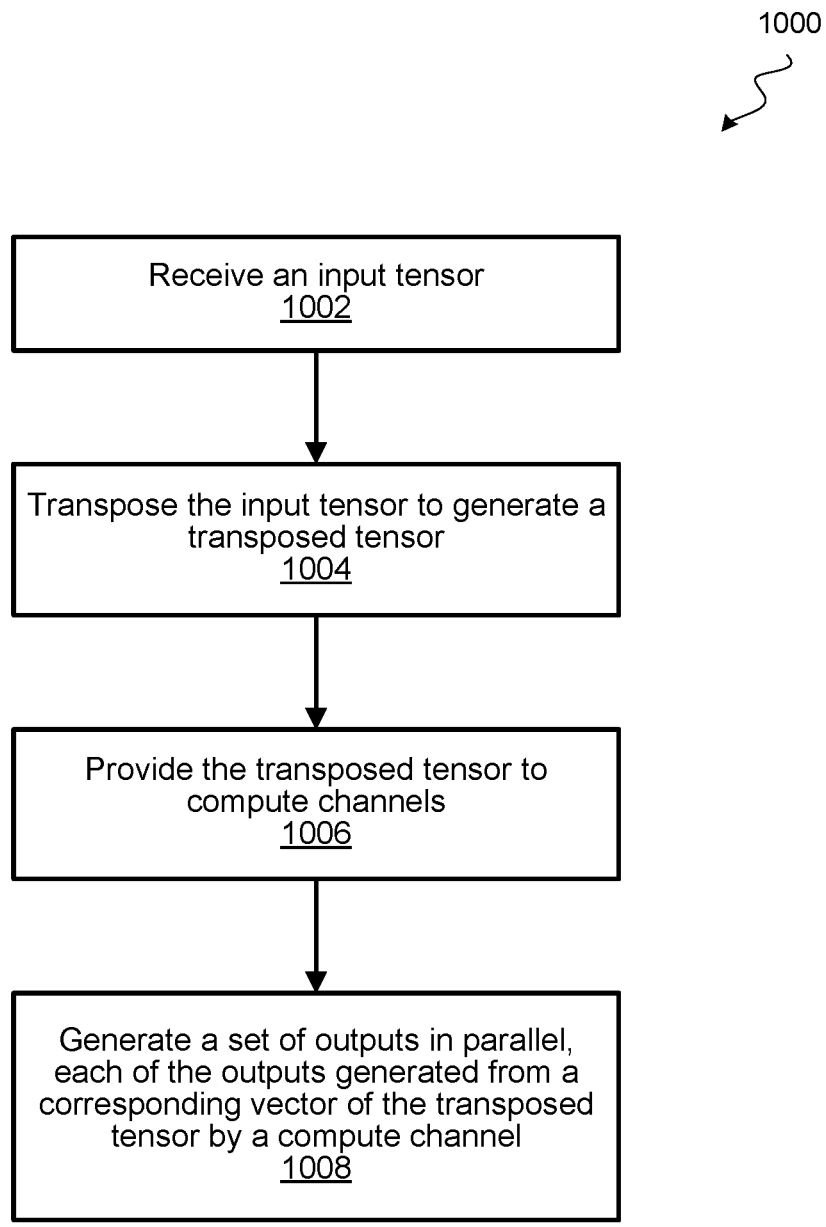
FIG. 10 illustrates a flow diagram of an example of a process for using a transpose circuit.

FIG. 10 illustrates a flow diagram of an example of a process 1000 that can be performed, for example, by an integrated circuit device to process an input tensor. The integrated circuit device can be, for example, a processing circuit such as a vector compute engine (e.g., vector compute engine 217). The integrated circuit device can be part of a data processor such as a neural network accelerator. The neural network accelerator may include a processing engine (PE) array, and the vector compute engine may include transpose circuitry to offload transpose operations from the PE array. For example, the vector compute engine may include multiple vector compute banks, and each vector compute bank may include a transpose circuit coupled to a set of compute channels.

Process 1000 may begin at block 1002 by receiving an input tensor at a transpose circuit. The input tensor can be a submatrix of a larger tensor. The input tensor can be received from a memory such as a state buffer memory. The input tensor can be stored in the state buffer memory across multiple row partitions, and the input tensor can be streamed into the transpose circuit from the state buffer memory for processing. In some implementations, the input tensor can also be received by the transpose circuit, for example, from a results buffer memory.

At block 1004, the transpose circuit can transpose the input tensor to generate a transposed tensor. By using a transpose circuit to perform the transposition, the PE array of the data processor can be freed up. Hence, transposition of the input tensor can be performed concurrently with PE array performing a matrix multiplication operation. To transpose the input tensor, the transpose circuit can receive input elements corresponding to a column in parallel, and output the input elements in series as a vector of the transposed tensor to a compute channel.

At block 1006, the transpose circuit may provide the transposed tensor to a set of compute channels. Each of the compute channels may include multiple arithmetic logic unit (ALU) circuits coupled in series, and each ALU can be configured to perform an arithmetic function. Collectively, the ALU circuits can be programmed to perform various computations.

At block 1008, the set of compute channels may generate a set of outputs in parallel, in which each of the outputs is generated from a corresponding vector of the transposed tensor by a compute channel. The set of outputs may include an output vector generated by applying an elementwise arithmetic operation to each element of the corresponding vector inputted into the compute channel. The set of outputs may include an output value generated by performing a computation (e.g., mean, variance, or count) on data elements of the vector inputted into the compute channel. The outputs from the compute channels can be written back to a memory (e.g., to corresponding row partitions of a state buffer memory) for further processing.

Figure 11:
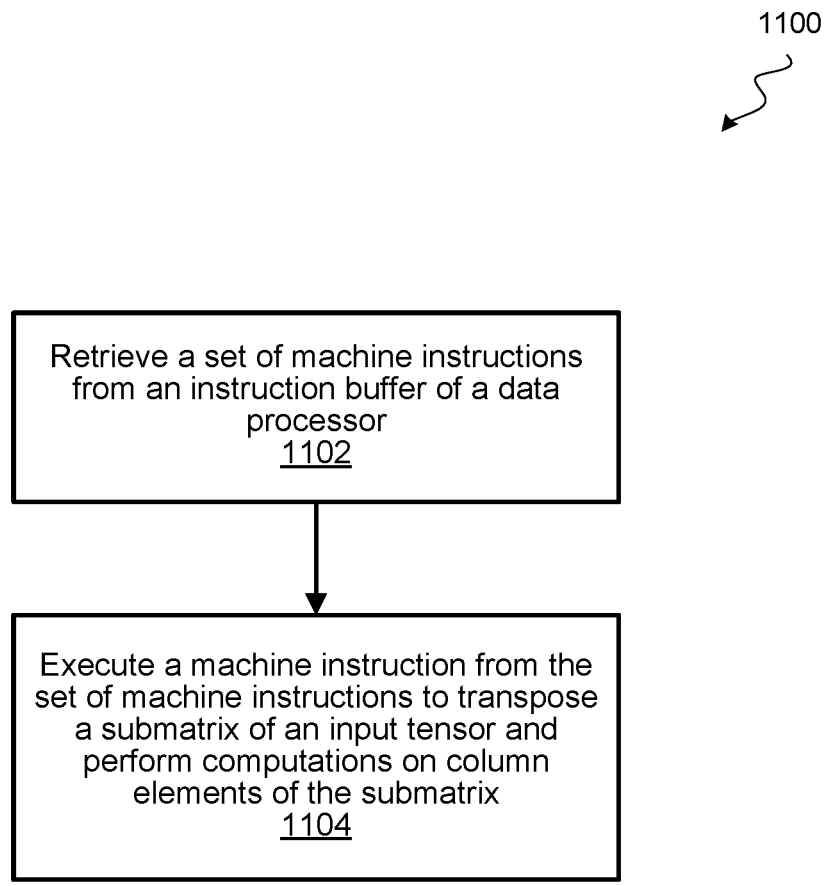
FIG. 11 illustrates a flow diagram of an example of a process for executing machine instructions.

FIG. 11 illustrates a flow diagram of an example of a process 1100 that can be performed, for example, by a data processor to perform computations on an input tensor. The data processor may include circuitry to accelerate neural network operations. For example, the data processor may include a compute engine (e.g., vector compute engine 217) having transpose circuitry and compute channels. The data processor can be programmed using machine instructions that are part of an instruction set associated with the architecture of the data processor. The instruction set may include individual machine instructions that combine transpose operation with computational operations.

At block 1102, a set of machine instructions can be retrieved from an instruction buffer of the data processor. The instruction buffer may include multiple instruction entries, and each entry may store one machine instruction. In some implementations, data processor may include multiple compute engines, and each compute engine may include its own instruction buffer.

At block 1104, a machine instruction from the set of machine instructions can be executed to transpose a submatrix of the input tensor, and perform computations on column elements of the submatrix. The machine instruction being executed may include a transpose configuration (e.g., a transpose bit), and the machine instruction can be decoded to configure the transpose circuitry according to the transpose configuration. The machine instruction also configures the compute channels to perform certain computations on data provided by the transpose circuit. Hence, a single machine instruction can be used to combine the transpose operation with computational operations. Another machine instruction from the set of machine instructions can be executed to transpose another submatrix of the input tensor, and perform computations on column elements of that submatrix. The two machine instructions can be executed on the same vector compute bank of a vector compute engine (e.g., in a sequential manner), or be executed on different vector compute banks (e.g., concurrently or in parallel). A single machine instruction can also be used to program multiple vector compute banks to execute the same machine instruction.

In some implementations, the set of machine instructions can be used to implement a neural network operator. For example, neural network operator can be a tensor normalization or tensor reduce operation. The machine instruction executed at block 1104 can be a transpose-and-compute machine instruction that is used to generate computational results on transposed data for the neural network operator. For example, execution of the machine instruction may transpose submatrices of an input tensor in a transpose circuit of a vector compute bank, and compute statistical values (e.g., mean, variance, count) on column elements of the submatrices being streamed into the compute channels of the vector compute bank. The statistical values can be stored in a set of row partitions of a memory for the vector compute bank for further processing.

The transpose-and-compute machine instruction can also be executed in additional vector compute banks to compute the statistical values for other portions of the same columns of the input tensor. The statistical values computed by the different vector compute banks can be copied into the same set of row partitions by executing one or more memory copy instructions. Then an aggregate instruction can be executed to aggregate the statistical values computed by the vector compute banks to generate aggregated statistical values for the columns of the input tensor. The statistical values can then be used to scale and/or offset data elements of the input tensor being streamed into the compute channels of the vector compute bank. If post-processing of the statistical values is needed before being applied to the input tensor (e.g., to compute a reciprocal square root of the variance of the column elements), a machine instruction can be executed on an activation engine of the data processor to perform such computations (e.g., compute the reciprocal square root).

Figure 12:
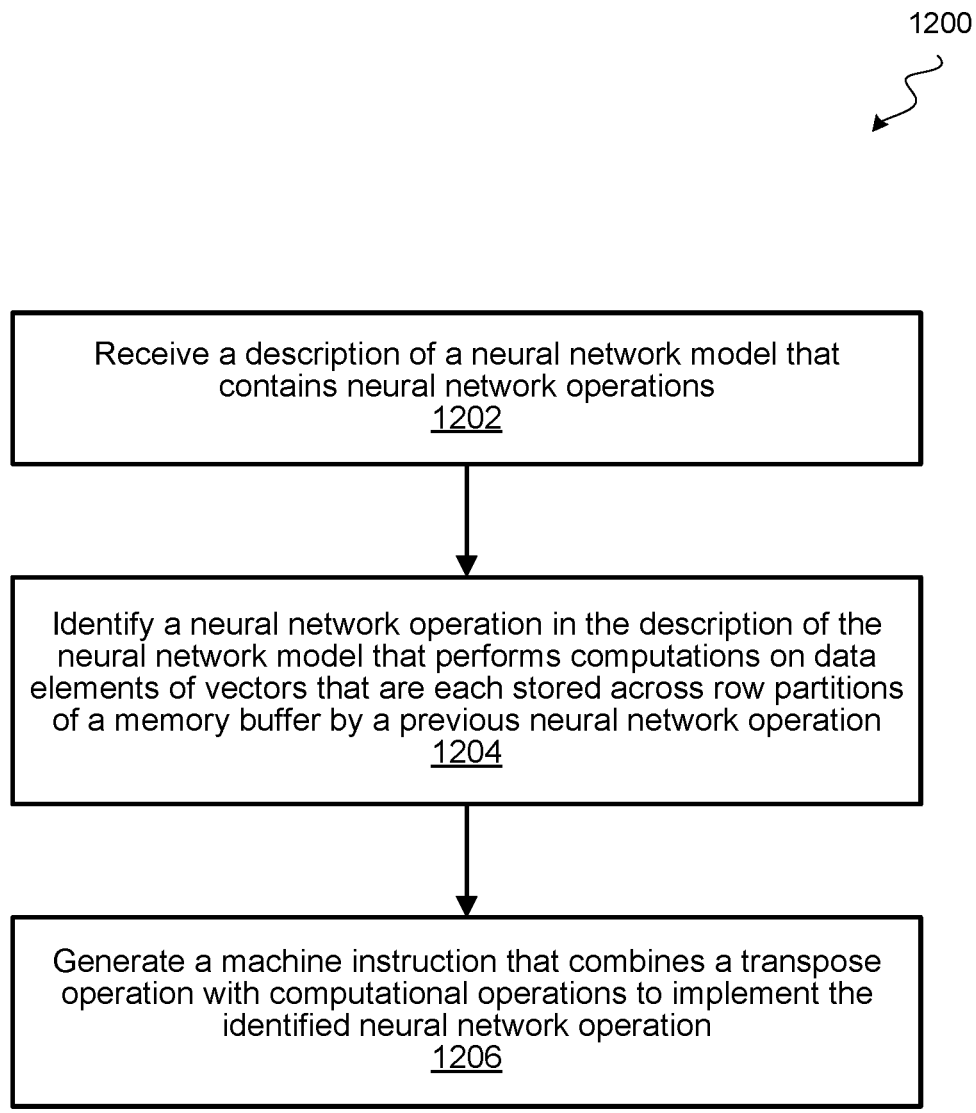
FIG. 12 illustrates a flow diagram of an example of a process for a compiler.

FIG. 12 illustrates a flow diagram of an example of a process 1200 for generating machine instructions to perform a neural network operation. Process 1200 can be performed, for example, by a compiler that interprets programming code describing a neural network model, and translates the programming code into machine instructions for execution on hardware. In some implementations, process 1200 can be implemented on a computer-readable medium that is executable by a processor of a computing system to compile the programming code of neural network model for loading onto a data processor for execution.

Process 1200 may begin at block 1202 by obtaining a description of the neural network model that contains neural network operations. The description of the neural network model can be, for example, in a programming language such as Java, C++, Tensorflow, PyTorch, Transformer, among many other examples. A neural network model can be represented using a compute graph such as a directed acyclic graph, which can be generated based on the computations and data flow provided in the description of the neural network model.

At block 1204, a neural network operation in the description of the neural network model having a data layout conflict can be identified. For example, the neural network operation may perform computations on data elements of vectors that have been stored across row partitions of a buffer memory by a previous operation (e.g., along columns of a tensor generated by a previous operation). The data layout conflict can be resolved by inserting a transpose operation to transpose the input tensor for the neural network operator.

At block 1206, a machine instruction that combines a transpose operation with computational operations can be generated to implement the identified neural network operation. The machine instruction can be executed to resolve the data layout conflict without using a separate transpose instruction. Hence, instead of having to read an input tensor from memory, write back a transposed version of the tensor into memory, and then perform computations on the tensor data, the transposition can be performed while streaming the data elements into a compute engine to perform the computations. Examples of such machine instructions may include TransposeBacthNormStats to transpose a tensor and compute statistical values such as mean and variance, TransposeTensorReduce to transpose a tensor and reduce the transposed tensor, as well as other instructions that combines transposition with computations.

Figure 13:
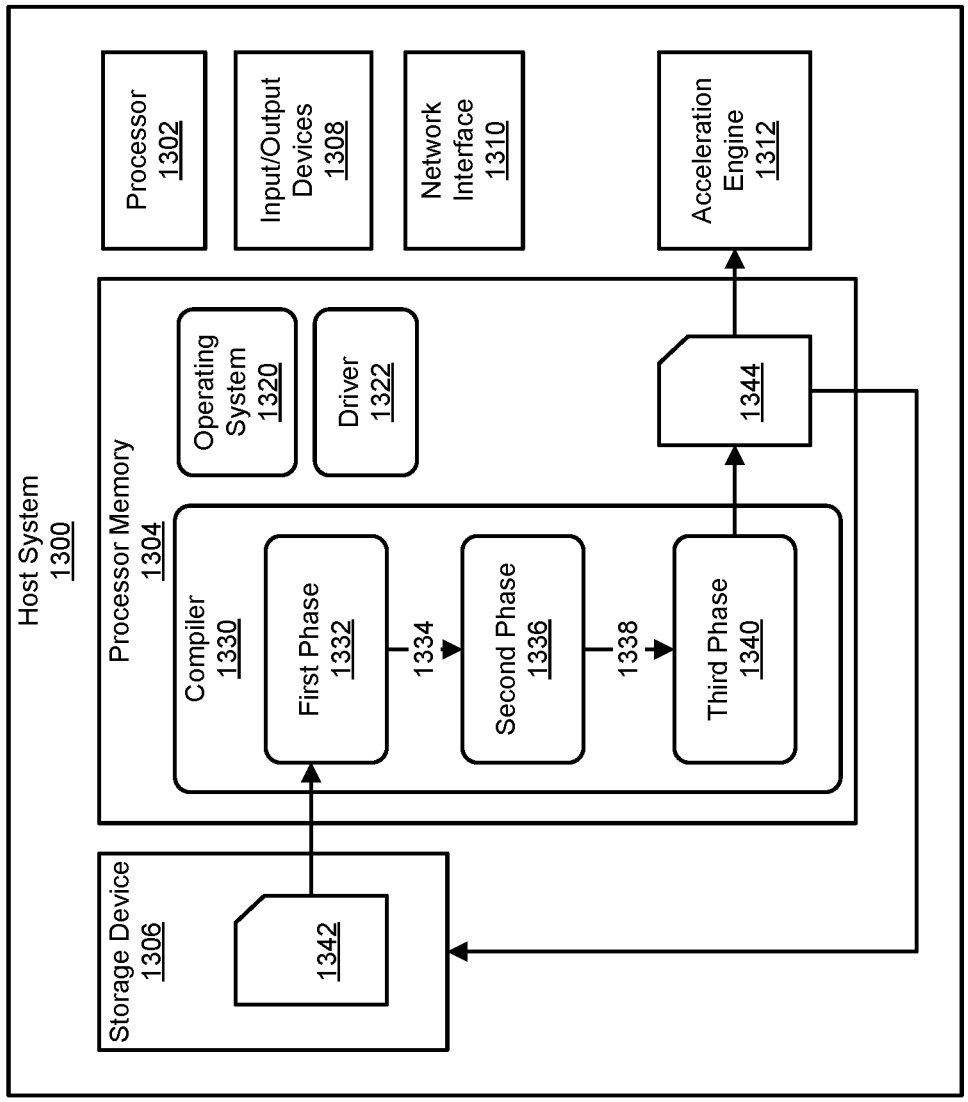
FIG. 13 illustrates a block diagram of an example of a compiler in a host system.

FIG. 13 illustrates a block diagram of an example of a host system 1300 on which a compiler 1330 can run. Compiler 1330 can be one example of a compiler that can perform process 1200 to generate instructions that combine transpose and computational operations. The illustrated host system 1300 is an example of a computing device, and includes a processor 1302, a processor memory 1304, at least one storage device 1306, various Input/Output (I/O) devices 1308, and at least one network interface 1310. In the example of FIG. 13, the host system 1300 also includes an acceleration engine 1312, which is an integrated circuit device that can accelerate certain operations or computations performed by the host system 1300. In various examples, the host system 1300 can be implemented as a server in a data center, a desktop computer, a laptop computer, a tablet computer, or a smartphone, among other examples. In some examples, operations or components discussed below as being performed or included in the host system 1300 can be performed or included in other computer devices. For example, the compiler 1330 can execute on the host system 1300 while the acceleration engine 1312 is located in a different host system or different computing device.

The processor 1302 is an integrated circuit device that can execute program code, in the form of instructions. The program code can be for various software applications or tools, such as an operating system 1320 or the illustrated compiler 1330. While the processor 1302 is executing a program, the instructions for the program can be stored in the processor memory 1304. The instructions can also be stored elsewhere, such as on the storage device 1306, and can be loaded into the processor memory 1304 when needed by the processor 1302. The processor 1302 can also use the processor memory 1304 for temporary storage of other data that the processor 1302 is operating on. In various examples, the processor memory 1304 is a volatile memory type, such as a type of random access memory, though non-volatile memory types can, alternatively or additionally, be used for the processor memory 1304.

The storage device 1306 is an example of a device that can include non-volatile memory. For example, the storage device 1306 can be a magnetic disk drive, a solid-state drive, or an optical drive, among other examples. Program code and other data stored on the storage device 1306 can remain present when the storage device 1306 is not powered on. Storage device 1306 can be uses as a type of non-transitory storage medium, or may include a reader that can access non-transitory storage medium.

The storage device 1306 is one example of a peripheral device. A peripheral device is a component that can be coupled to the host system 1300 to add functionality to the host system 1300. Other examples of peripheral devices include Input/Output devices 1308 and network interface 1310. The Input/Output devices 1308 can include user input and/or output devices, such as keyboard, mouse, pointer, touchpad, touchscreen, microphone, display screen, speaker, printer, and scanner, among other examples. Network interface 1310, which can be implemented using a network interface card, can provide access to one or more networks. Network interface 1310 can include, for example, a physical port for connecting a network cable and/or one or more antennas and/or radios for wireless communication such as Wi-Fi, cellular, and/or other over-the-air networks. Network interface 1310 can also be described as an I/O device.

The acceleration engine 1312 is also another type of peripheral device or I/O device. The acceleration engine 1312 is a device that is purpose-built to perform certain operations that can be performed by the processor 1302, but can be performed faster by the acceleration engine 1312. For example, the acceleration engine 1312 can be a neural network accelerator that is capable of performing large scale, parallel computations of a neural network more efficiently than when the computations are performed by the processor 1302. As another example, the acceleration engine 1312 can be a graphics processing unit (GPU), and may be optimized to perform the computations needed for graphics rendering. Other examples of devices that can be implemented by the acceleration engine 1312 include cryptographic accelerators, compression and decompression accelerators, 3-D accelerators, regular expression accelerators, security accelerators, and others.

In various examples, the acceleration engine 1312 can execute program code to perform certain operations. For example, when the acceleration engine 1312 is a neural network accelerator, the acceleration engine 1312 can be programmed to execute a particular neural network model, such as one that performs image recognition or one that performs machine translation. As a further example, to support the execution of a neural network model, the acceleration engine 1312 can be programed to perform operations such as copying data for the neural network between processor memory 1304 and the acceleration engine 1312 (e.g., copying input data for the neural network from processor memory 1304 into the acceleration engine 1312, copying results from the acceleration engine 1312 into the processor memory 1304, etc.).

To generate program code for the acceleration engine 1312, the host system 1300 can execute the compiler 1330. Compilers, in general, are software programs that translate program code written in a human-readable language into a format (e.g., machine instructions) that can be read and processed by an integrated circuit device. In the example of FIG. 13, the acceleration engine 1312 can be a neural network accelerator, and the compiler 1330 can be a compiler for compiling a neural network description into instructions to be executed by the acceleration engine 1312. When the acceleration engine 1312 implements a different type of accelerator, a different compiler can be used.

The compiler 1330 can be activated, for example, when the operating system 1320 receives keyboard, mouse, touchscreen, voice command, or other inputs from the Input/Output devices 1308. The inputs can further include parameters for the compiler 1330, such as input code 1342 to compile and configuration options for the compilation process. Once the compiler 1330 is activated, the processor 1302 can load the instructions for the compiler 1330 into the processor memory 1304, and execute the compiler from the processor memory 1304. In some implementations, compiler 1330 may identifying steps to be performed by the processor 1302, rather than by the acceleration engine 1312. For example, the processor 1302, through the execution of a driver 1322, may need to perform steps such as configuring Direct Memory Access (DMA) descriptors for moving data into or out of the acceleration engine 1312, among other examples.

In the example of FIG. 13, the compiler 1330 includes a first stage 1332, a second stage 1336, and a third stage 1340, which each perform different operations to produce compiled code 1344. In other examples, the compiler 1330 can combine the operations of the first stage 1332, second stage 1336, and/or third stage 1340 into fewer stages, or can divide the operations of one or more of the stages into multiple stages. In some implementations, compiler 1330 can also be modified such that certain operation(s) from one stage can be executed in a different stage.

The first stage 1332 (may also be referred to as the front stage) can receive and process input code 1342. The input code 1342 can describe a program in a high-level programming language, such as Python, Java, C++, among other examples, and may utilize software libraries tailored for neural networks such as TensorFlow, PyTorch, etc. The input code 1342 can be a description of a neural network model that describe, for example, steps to perform image recognition, speech recognition, machine translation, or other operations. The input code 1342 can be obtained from the storage device 1306. Alternatively, though not illustrated, the input code 1342 can be located in the processor memory 1304, or can be obtained from a network location using the network interface 1310.

Processing of the input code 1342 can include parsing the input code 1342, performing syntax and semantic analysis on the input code 1342 to identify operators (e.g., operations such as computations, memory accesses, and/or other functions, etc.) described in the input code 1342, and sorting the operators described in the input code 1342. For example, the operators described in the input code 1342 can be sorted into layers, where the outputs of one layer provide the inputs to a next layer. The output of the first stage 1332 can be an intermediate representation (IR) 1334 of the input code 1342. In some implementations, the IR 1334 can be code representing a compute graph (e.g., data flow graph, data dependency graph, etc.). The compute graph may include nodes and edges connecting the nodes. The nodes may represent operators such as computations, data rearrangements such as transformations, memory accesses, and/or other operations; and the edges or connections between the nodes may represent dependencies between the nodes, such as data dependencies, memory dependencies, or operational dependencies, among other examples. The compute graph can be organized, for example, in the layers, nodes, and connections between nodes of a neural network model.

The second stage 1336 (may also be referred to as the middle-end stage) can perform intermediate processing on the IR 1334 output from the first stage 1332. The intermediate processing may include performing various optimizations on the IR 1334. The optimizations may include target independent optimizations that are hardware agnostic, and/or target specific optimizations that are tailored for the hardware architecture executing the program of input code 1342. Target independent optimizations may include algebraic simplification, graph minimization such as removal of unnecessary or redundant operations and/or dependencies, high-level dependency optimization by rearranging operators to improve compute latencies, etc.

Target specific optimizations include optimizations that take into account the capabilities of the hardware (e.g., acceleration engine 1312) that the input code is being compiled for. Such optimizations may include operators fusion to fuse multiple operators into an execution kernel supported by the hardware, data layout transformation to efficiently fit data into the hardware, etc. The target specific optimizations may take into account considerations such as whether the operations being performed in any one layer, or at any one node in a layer, may be too many for the acceleration engine 1312 to perform at the same time. The acceleration engine 1312 may, for example, have a limited amount of local storage space for the data needed for a computation, or the computations may be more than the acceleration engine 1312 can perform at one time. In such scenario, the operators of the layer or node can be broken down into smaller operations, which can fit into the acceleration engine's local memory and/or can fit into the computing capacity of the acceleration engine 1312. The output of the second stage 1336 can be an optimized IR 1338 such as code representing an optimized compute graph.

The third stage 1340 (may also be referred to as the back-end stage) can operate on the output 1338 of the second stage 1336, and perform various steps before producing the instructions (e.g., machine code) that are to be executed by the acceleration engine 1312. These steps can include instruction and data scheduling, register allocation, and/or code generation. Instruction and data scheduling determines the order in which instructions are executed and data are processed by the acceleration engine 1312, and may include low-level dependency optimization by rearranging operations to improve parallel execution, handling dependencies between nodes by inserting synchronization instructions into the code, etc. Register allocation may include identifying optimizations in register usage and/or memory bandwidth usage to avoid spilling, and reordering of register and/or memory accesses to hide access latencies given the memory capacity of the hardware, etc. Code generation converts the low-level optimized IR into machine code executable by the acceleration engine 1312, and includes mapping operations into hardware instructions according to the architecture of the acceleration engine 1312. The output of the third stage 1340 is compiled code 1344, which may include machine instructions in binary format. In some examples, the compiled code 1344 can be stored in the processor memory 1304. Alternatively or additionally, the compiled code 1344 can be copied to the storage device 1306 or to a network location. As noted above, the acceleration engine 1312 may be located at a different host system, in which case the compiled code 1344 can be sent over the network interface 1310 to the other host system.

In the example of FIG. 13, the host system 1300 can be executing a driver 1322, which can also be referred to as a device driver or runtime driver, that manages the acceleration engine 1312. The driver 1322 can provide an interface between applications executing on the host system 1300 (or on another host system) and the acceleration engine 1312. For example, the driver 1322 can provide an Application Program Interface (API) that defines functions for feeding input data to the acceleration engine 1312 and defining the operation to perform on the input data. In this and other examples, the driver 1322 can configure the acceleration engine 1312 to perform the operation. For example, the driver 1322 can identify a neural network model that the acceleration engine 1312 is to execute, as well as the location in the processor memory 1304 or on the storage device 1306 where the compiled code 1344 for the neural network model is located. The driver 1322 can further load into the acceleration engine 1312 or cause the acceleration engine 1312 to load the compiled code 1344, can load or cause the acceleration engine 1312 to load the input data on which the neural network model is to operate, and/or can cause the acceleration engine 1312 to begin executing on the input data. Once the acceleration engine 1312 has finished, the acceleration engine 1312 can notify the driver 1322, and the driver 1322 can deliver a result back to the application that requested the result.

Figure 14:
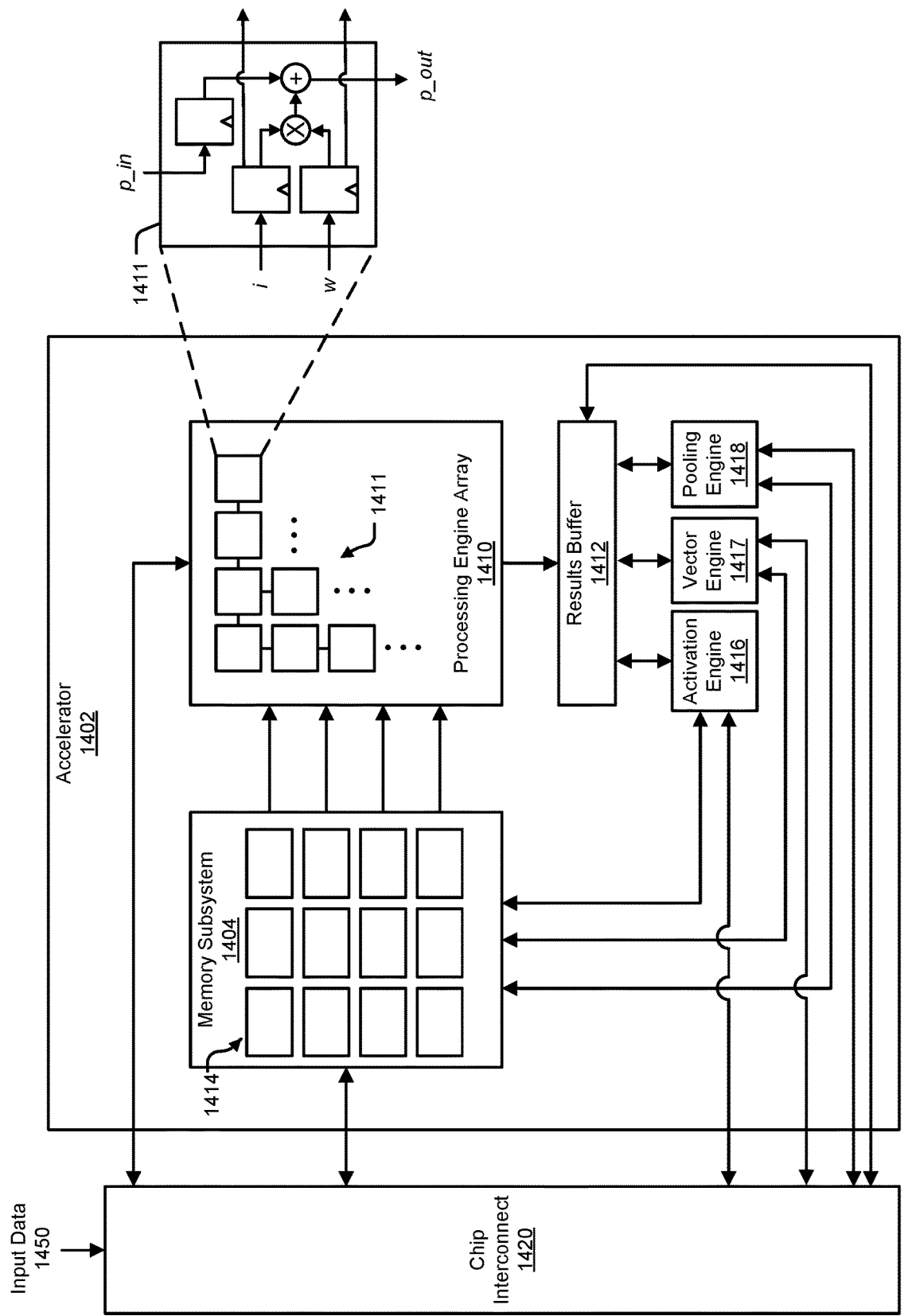
FIG. 14 illustrates a block diagram of an example of an integrated circuit device.

FIG. 14 is a block diagram illustrating an example of an integrated circuit device that can include transpose circuitry. The example of FIG. 14 illustrates an accelerator 1402, which can be used to implement, for example, neural network accelerator 200. In various examples, the accelerator 1402, for a set of input data (e.g., input data 1450), can execute computations using a processing engine array 1410, an activation engine 1416, a vector engine 1417, and/or a pooling engine 1418. In some examples, the example accelerator 1402 may be an integrated circuit component of a processor, such as a neural network processor. The processor may have other integrated circuit components, including additional accelerator engines.

In various implementations, the memory subsystem 1404 can include multiple memory banks 1414. Memory subsystem 1404 can also be referred to as a state buffer. In these implementations, each memory bank 1414 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1414. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1404 can permit simultaneous access to the read or write channels of multiple memory banks. As another example, the memory subsystem 1404 can include arbitration logic such that arbitration between, for example, the outputs of multiple memory banks 1414 can result in more than one memory bank's output being used. In these and other examples, though globally managed by the memory subsystem 1404, each memory bank can be operated independently of any other.

Having the memory banks 1414 be independently accessible can increase the efficiency of the accelerator 1402. For example, values can be simultaneously read and provided to each row of the processing engine array 1410, so that the entire processing engine array 1410 can be in use in one clock cycle. As another example, the memory banks 1414 can be read at the same time that results computed by the processing engine array 1410 are written to the memory subsystem 1404. In contrast, a single memory may be able to service only one read or write at a time. With a single memory, multiple clock cycles can be required, for example, to read input data for each row of the processing engine array 1410 before the processing engine array 1410 can be started.

In various implementations, the memory subsystem 1404 can be configured to simultaneously service multiple clients, including the processing engine array 1410, the activation engine 1416, the vector engine 1417, the pooling engine 1418, and any external clients that access the memory subsystem 1404 over a communication fabric 1420. In some implementations, being able to service multiple clients can mean that the memory subsystem 1404 has at least as many memory banks as there are clients. In some cases, each row of the processing engine array 1410 can count as a separate client. In some cases, each column of the processing engine array 1410 can output a result, such that each column can count as a separate write client. In some cases, output from the processing engine array 1410 can be written into the memory banks 1414 that can then subsequently provide input data for the processing engine array 1410. As another example, the activation engine 1416, the vector engine 1417, and the pooling engine 1418 can include multiple execution channels, each of which can be separate memory clients. The memory banks 1414 can be implemented, for example, using static random access memory (SRAM).

In various implementations, the memory subsystem 1404 can include control logic. The control logic can, for example, keep track of the address spaces of each of the memory banks 1414, identify memory banks 1414 to read from or write to, and/or move data between the memory banks 1414. In some implementations, memory banks 1414 can be hardwired to particular clients. For example, a set of memory banks 1414 can be hardwired to provide values to the rows of the processing engine array 1410, with one memory bank servicing each row. As another example, a set of memory banks can be hard wired to receive values from columns of the processing engine array 1410, with one memory bank receiving data for each column.

The processing engine array 1410 is the computation matrix of the example accelerator 1402. The processing engine array 1410 can, for example, execute parallel integration, convolution, correlation, and/or matrix multiplication, among other things. The processing engine array 1410 includes multiple processing engines 1411, arranged in rows and columns, such that results output by one processing engine 1411 can be input directly into another processing engine 1411. Processing engines 1411 that are not on the outside edges of the processing engine array 1410 thus can receive data to operate on from other processing engines 1411, rather than from the memory subsystem 1404.

In various examples, the processing engine array 1410 uses systolic execution, in which data arrives at each processing engine 1411 from different directions at regular intervals. In some examples, input data can flow into the processing engine array 1410 from the left and weight values can be loaded at the top. In some examples weights and input data can flow from the left and partial sums can flow from top to bottom. In these and other examples, a multiply-and-accumulate operation moves through the processing engine array 1410 as a diagonal wave front, with data moving to the right and down across the array. Control signals can be input at the left at the same time as weights, and can flow across and down along with the computation.

In various implementations, the number of columns in the processing engine array 1410 determines the computational capacity of the processing engine array 1410, and the number of rows determines the required memory bandwidth for achieving maximum utilization of the processing engine array 1410. The processing engine array 1410 can have, for example, 128 columns and 128 rows, or some other number of columns and/or rows.

An example of a processing engine 1411 is illustrated in FIG. 14 in an inset diagram. As illustrated by this example, a processing engine 1411 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1411.

In the illustrated example, an input from above can include a partial sum, p_in, provided either from another processing engine 1411 or from a previous round of computation by the processing engine array 1410. When starting a computation for a new set of input data, the top row of the processing engine array 1410 can receive a fixed value for p_in, such as zero. As illustrated by this example, i and w are multiplied together and the result is summed with p_in to produce a new partial sum, p_out, which can be input into another processing engine 1411. Various other implementations of the processing engine 1411 are possible.

Outputs from the last row in the processing engine array 1410 can be temporarily stored in the results buffer 1412. The results can be intermediate results, which can be written to the memory banks 1414 to be provided to the processing engine array 1410 for additional computation. Alternatively, the results can be final results, which, once written to the memory banks 1414 can be read from the memory subsystem 1404 over the communication fabric 1420, to be output by the system.

In some implementations, the accelerator 1402 includes an activation engine 1416. In these implementations, the activation engine 1416 can combine the results from the processing engine array 1410 into one or more output activations. For example, for a convolutional neural network, convolutions from multiple channels can be summed to produce an output activation for a single channel. In other examples, accumulating results from one or more columns in the processing engine array 1410 may be needed to produce an output activation for a single node in the neural network. In some examples, activation engine 1416 can be bypassed.

In various examples, the activation engine 1416 can include multiple separate execution channels. In these examples, the execution channels can correspond to the columns of the processing engine array 1410, and can perform an operation on the outputs of a column, the result of which can be stored in the memory subsystem 1404. In these examples, the activation engine 1416 may be able to perform between 1 and n parallel computations, where n is equal to the number of columns in the processing engine array 1410. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1402 can include a pooling engine 1418. Pooling is the combining of outputs of the columns of the processing engine array 1410. Combining can include for example, computing a maximum value, a minimum value, an average value, a median value, a summation, a multiplication, or another logical or mathematical combination. In various examples, the pooling engine 1418 can include multiple execution channels that can operating on values from corresponding columns of the processing engine array 1410. In these examples, the pooling engine 1418 may be able to perform between 1 and n parallel computations, where n is equal to the number of columns in the processing engine array 1410. In various examples, execution channels of the pooling engine 1418 can operate in parallel and/or simultaneously. In some examples, the pooling engine 1418 can be bypassed.

In some implementations, the accelerator 1402 can further include a vector engine 1417. Vector engine 1417 can be, for example, vector compute engine 217 or 917. Vector engine 1417 is a compute engine that can perform computations and manipulations on values stored in memory subsystem 1404 and/or results buffer 1412 such as values representing matrices of input values, weight values, intermediate results, etc. Vector engine 1417 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 1417 can operate in parallel and/or simultaneously. In some examples, the vector engine 1417 can be bypassed or be omitted.

Herein, the activation engine 1416, the vector engine 1417, and the pooling engine 1418 may be referred to collectively as execution engines. The processing engine array 1410 is another example of an execution engine. Another example of an execution engine is a Direct Memory Access (DMA) engine, which may be located outside the accelerator 1402.

Input data 1450 can arrive over the communication fabric 1420. The communication fabric 1420 can connect the accelerator 1402 to other components of a processor, such as a DMA engine that can obtain input data 1450 from an Input/Output (I/O) device, a storage drive, or a network interface. The input data 1450 can be, for example one-dimensional data, such as a character string or numerical sequence, or two-dimensional data, such as an array of pixel values for an image or frequency and amplitude values over time for an audio signal. In some examples, the input data 1450 can be three-dimensional, as may be the case with, for example, the situational information used by a self-driving car or virtual reality data. In some implementations, the memory subsystem 1404 can include a separate buffer for the input data 1450. In some implementations, the input data 1450 can be stored in the memory banks 1414 when the accelerator 1402 receives the input data 1450.

In some examples, the accelerator 1402 can implement a neural network processing engine. In these examples, the accelerator 1402, for a set of input data 1450, can execute a neural network to perform a task for which the neural network was trained. Executing a neural network on a set of input data can be referred to as inference or performing inference.

The weights for the neural network can be stored in the memory subsystem 1404, along with input data 1450 on which the neural network will operate. The neural network can also include instructions, which can program the processing engine array 1410 to perform various computations on the weights and the input data. The instructions can also be stored in the memory subsystem 1404, in the memory banks 1414 or in a separate instruction buffer. The processing engine array 1410 can output intermediate results, which represent the outputs of individual layers of the neural network. In some cases, the activation engine 1416, the vector engine 1417, and/or pooling engine 1418 may be enabled for computations called for by certain layers of the neural network. The accelerator 1402 can store the intermediate results in the memory subsystem 1404 for inputting into the processing engine array 1410 to compute results for the next layer of the neural network. The processing engine array 1410 can further output final results from a last layer of the neural network. The final results can be stored in the memory subsystem 1404 and then be copied out to host processor memory or to another location.

Figure 15:
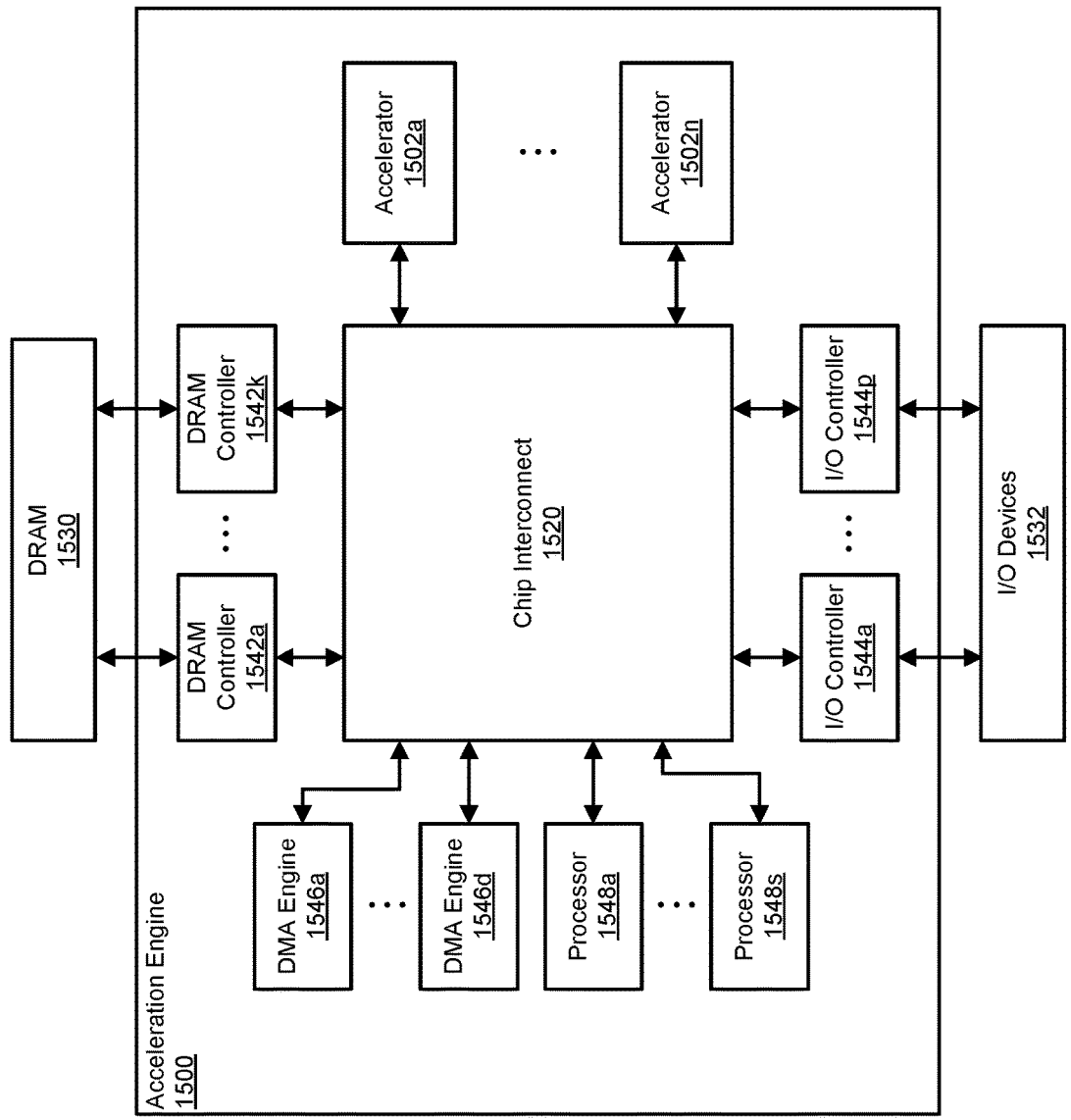
FIG. 15 illustrates a block diagram of an example of an acceleration engine.

FIG. 15 includes a block diagram that illustrates an example of an acceleration engine 1500. The acceleration engine 1500 is an example of an integrated circuit that can include one or more accelerators 1502a-1502n that may be similar to the accelerator illustrated in FIG. 14.

In the example of FIG. 15, the acceleration engine 1500 includes multiple accelerators 1502a-1502n, each of which can perform a set of operations. In various examples, the accelerators 1502a-1502n are for particular types of operations, so that the accelerators 1502a-1502n can perform the operations much faster than when similar operations are performed by a general-purpose processor. In various examples, to perform a set of operations, input data on which the operations are to be performed must first be moved into the accelerators 1502a-1502n. Additionally, in some cases, program code is also moved into the accelerators 1502a-1502n, which programs the operations that the accelerators 1502a-1502n will perform on the data. In the illustrated example, the acceleration engine 1500 includes n accelerators 1502a-1502n. Examples of accelerators that can be included in the acceleration engine 1500 include graphics accelerators, floating point accelerators, neural network accelerators, and others. In various examples, the accelerators 1502a-1502n can each be the same (e.g., each of the is a graphics accelerator) or can be different (e.g., the accelerators 1502a-1502n include a graphics accelerator, a floating point accelerator, and neural network accelerator).

The example acceleration engine 1500 further includes DRAM controllers 1542a-1542k for communicating with an external memory. The external memory is implemented, in this example, using DRAM 1530. In the illustrated example, the acceleration engine 1500 includes k DRAM controllers 1542a-1542k, each of which may be able to communicate with an independent set of banks of DRAM. In other examples, other types of RAM technology can be used for the external memory. The DRAM controllers 1542a-1542k can also be referred to as memory controllers.

In various examples, input data and/or program code for the accelerators 1502a-1502n can be stored in the DRAM 1530. Different programs can cause the accelerators 1502a-1502n to perform different operations. For example, when one of the accelerators is a neural network accelerator, one program can configure the neural network accelerator to perform speech recognition while another program can configure the neural network accelerator to perform image recognition. In various examples, different accelerators 1502a-1502n can be programmed with different programs, so that each performs a different set of operations. In various examples, the processors 1548a-1548s can manage moving of program code from the DRAM 1530 to the accelerators 1502a-1502n.

The example acceleration engine 1500 further includes I/O controllers 1544a-1544p for communicating with I/O devices 1532 in the system. The acceleration engine 1500 can communicate with I/O devices over, for example, a processor bus. In some examples, the processor bus can be implemented using Peripheral Component Interconnect (PCI) and/or a variation of the PCI bus protocol. The processor bus can connect the acceleration engine 1500 to I/O devices such as, for example, input and output devices, memory controllers, storage devices, and/or network interface cards, among other things. In some examples, the I/O controllers 1544-1544p can enable the acceleration engine 1500 to act as an I/O device for a host processor. For example, the acceleration engine 1500 can be the recipient of input data from the host processor, and a command indicating an operation to be performed on the input data (e.g., a particular computation or analysis). In the illustrated example, the acceleration engine 1500 includes p I/O controllers 1544a-1544p, each of which may include a separate root complex and may communicate with a separate set of I/O devices 1532. In other examples, other standardized bus protocols, such as Ultra Path Interconnect (UPI) can be used for the host bus. In other examples, a proprietary bus protocol can be used.

Movement of data in the acceleration engine 1500 can be managed by one or more processors 1548a-1548s, which can also be referred to as data management processors. In the example of FIG. 15, the acceleration engine 1500 includes s processors 1548a-1548s incorporated into the device (e.g., on the same silicon die). In other examples, the processors 1548a-1548s can be external to the acceleration engine 1500 (e.g., on a different die and/or in a different package). In some examples, the processors 1548a-1548s can manage the movement of data from I/O devices 1532 to the accelerators 1502a-1502n or the DRAM 1530. For example, input data may be located at an I/O device 1532 or in processor memory, and the processors 1548a-1548s can move the input from the I/O device 1532 or processor memory into an accelerator or into DRAM 1530. As another example, program code for the accelerators 1502a-1502n may be located on an I/O device 1532 or in processor memory.

The example acceleration engine 1500 further includes DMA engines 1546a-1546d that can move data between the accelerators 1502a-1502n, DRAM controllers 1542a-1542k, and I/O controllers 1544a-1544p. In the illustrated example, the acceleration engine 1500 includes d DMA engines 1546a-1546d. In some implementations, the DMA engines 1546a-1546d can be assigned to specific tasks, such as moving data from the DRAM controllers 1542a-1542d to the accelerators 1502a-1502n, or moving data between the I/O controllers 1544a-1544p and the accelerators 1502a-1502n. These tasks can be assigned, for example, by enqueueing descriptors with the DMA engines 1546a-1546d, where a descriptor identifies an address for a block of data and an operation (e.g., a read or a write) to perform. A descriptor, for example, can direct a DMA engine to instruct a DMA controller to read a block of data from DRAM 1530. A descriptor can, as a further example, instruct the DMA engine to write data, read by the DMA controller, to an accelerator. Further descriptors can be used to move data from an accelerator to DRAM 1530.

In various examples, each of the processors 1548a-1548s can be responsible for managing the data movement for a different accelerator. In some examples, a processor may manage the data movement for more than one accelerator. Similarly, in various examples, each of the processors 1548a-1548s can be assigned to one or more DMA engines 1546a-1546d. In these and other examples, associations between processors 1548a-1548s, accelerators 1502a-1502n, and DMA engines 1546a-1546d are determined by program code being executed by each respective processor.

In the example acceleration engine 1500, the various components can communicate over a chip interconnect 1520. The chip interconnect 1520 primarily includes wiring for routing data between the components of the acceleration engine 1500. In some cases, the chip interconnect 1520 can include a minimal amount of logic, such as multiplexors to control the direction of data, flip-flops for handling clock domain crossings, and timing logic.

Figure 16:
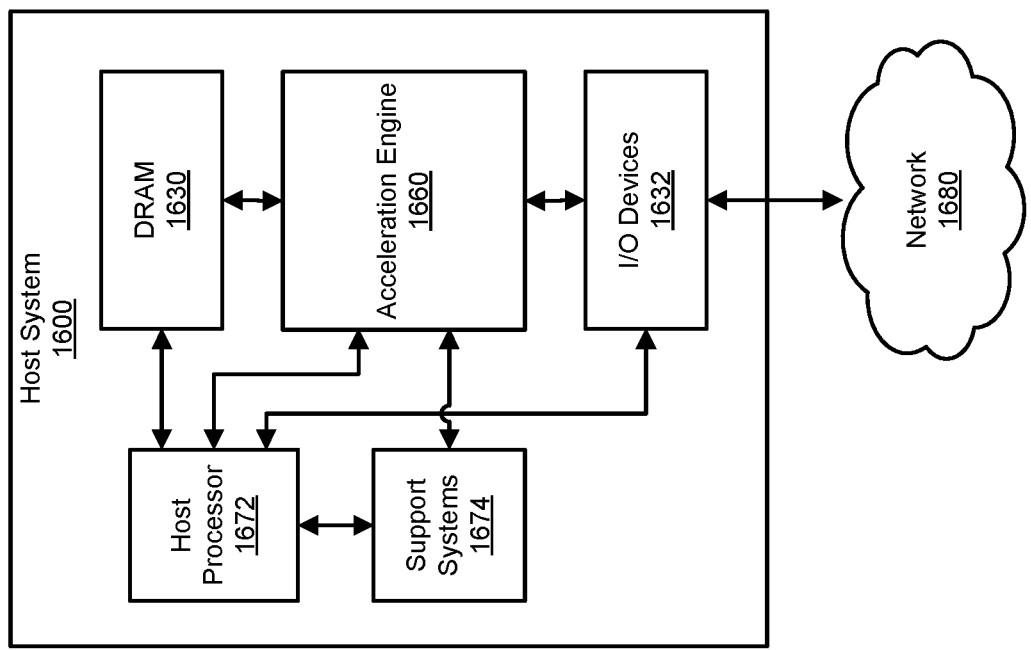
FIG. 16 illustrates a block diagram of an example of a host system.

FIG. 16 includes a block diagram that illustrates an example of a host system 1600 in which an acceleration engine 1660 can be used. The acceleration engine 1660 of FIG. 16 is an example of a device that can include one or more accelerators such as is illustrated in FIG. 15. The example host system 1600 of FIG. 16 includes the acceleration engine 1660, a host processor 1672, DRAM 1630 or processor memory, I/O devices 1632, and support systems 1674. In various implementations, the host system 1600 can include other hardware that is not illustrated here.

The host processor 1672 is a general-purpose integrated circuit that is capable of executing program instructions. In some examples, the host processor 1672 can include multiple processing cores. A multi-core processor may include multiple processing units within the same processor. In some examples, the host system 1600 can include more than one host processor 1672. In some examples, the host processor 1672 and the acceleration engine 1660 can be one chip, such as, one or more integrated circuits within the same package.

In various examples, the host processor 1672 can communicate with other components in the host system 1600 over one or more communication channels. For example, the host system 1600 can include a host processor bus, which the host processor 1672 can use to communicate with the DRAM 1630, for example. As another example, the host system 1600 can include an I/O bus, such as a PCI-based bus, over which the host processor 1672 can communicate with the acceleration engine 1660 and/or the I/O devices 1632, for example. In various examples, the host system 1600 can, alternatively or additionally, include other communication channels or busses, such as serial busses, power management busses, storage device busses, and so on.

In some examples, software programs executing on the host processor 1672 can receive or generate input for processing by the acceleration engine 1660. In some examples, the programs can select an appropriate neural network to execute for a given input. For example, a program may be for language translation, and can select one or more neural networks capable of speech recognition and/or machine translation. In these and other examples, the programs can configure the acceleration engine 1660 with the neural network to execute, and/or can select a neural network processing engine on the acceleration engine 1660 that has previously been configured to execute the desired neural network. In some examples, once the acceleration engine 1660 has started an inference on input data, the host processor 1672 can manage the movement of data (such as weights, instructions, intermediate results, results of conditional layers, and/or final results) into or out of the acceleration engine 1660.

In some examples, a software program that is using the acceleration engine 1660 to conduct an inference can read the result from a conditional layer from the acceleration engine 1660 and/or from a storage location, such as in DRAM 1630. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1630 is memory that is used by the host processor 1672 for storage of program code that the host processor 1672 is in the process of executing, as well as values that are being operated on. In some examples, the data for a neural network (e.g., weight values, instructions, and other data) can be all or partially stored in the DRAM 1630. DRAM is a common term for processor memory, and though DRAM is volatile memory, processor memory can be volatile and/or non-volatile. Though not illustrated here, the host system 1600 can include other volatile and non-volatile memories for other purposes. For example, the host system 1600 can include a Read-Only Memory (ROM) that stores boot code for booting the host system 1600 at power on, and/or Basic Input/Output System (BIOS) code.

Though not illustrated here, the DRAM 1630 can store instructions for various programs, which can be loaded into and be executed by the host processor 1672. For example, the DRAM 1630 can be storing instructions for an operating system, one or more data stores, one or more application programs, one or more drivers, and/or services for implementing the features disclosed herein.

The operating system can manage and orchestrate the overall operation of the host system 1600, such as scheduling tasks, executing applications, and/or controller peripheral devices, among other operations. In some examples, a host system 1600 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1600. For example, some drivers can provide communication between the operating system and peripheral devices or I/O devices 1632. Alternatively or additionally, some drivers may provide communication between application programs and the operating system, and/or application programs and peripheral devices accessible to the host system 1600. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1632 can include hardware for connecting to user input and output devices, such as keyboards, mice, pens, tablets, voice input devices, touch input devices, displays or monitors, speakers, and printers, among other devices. The I/O devices 1632 can also include storage drives and/or network interfaces for connecting to a network 1680. For example, the host system 1600 can use a network interface to communicate with storage devices, user terminals, other computing devices or servers, and/or other networks, among various examples.

In various examples, one or more of the I/O devices 1632 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1600 or may be in an external enclosure. A storage device can be fixed (e.g., attached by screws) or removable (e.g., having a physical release mechanism and possibly a hot-plug mechanism).

Storage devices, the DRAM 1630, and any other memory component in the host system 1600 are examples of computer-readable storage media. Computer-readable storage media are physical mediums that are capable of storing data in a format that can be read by a device such as the host processor 1672. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1632 can be PCI-based devices. In these examples, a PCI-based I/O device includes a PCI interface for communicating with the host system 1600. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1674 can include hardware for coordinating the operations of the acceleration engine 1660. For example, the support systems 1674 can include a microprocessor that coordinates the activities of the acceleration engine 1660, including moving data around on the acceleration engine 1660. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1672. In some examples, the program executed by the microprocessor is stored on the hardware of microprocessor, or on a non-volatile memory chip in the host system 1600. In some examples, the microprocessor and the acceleration engine 1660 can be on chip, such as one integrated circuit on the same die and in the same package.

In some examples, the support systems 1674 can be responsible for taking instructions from the host processor 1672 when programs executing on the host processor 1672 request the execution of a neural network. For example, the host processor 1672 can provide the support systems 1674 with a set of input data and a task that is to be performed on the set of input data. In this example, the support systems 1674 can identify a neural network that can perform the task, and can program the acceleration engine 1660 to execute the neural network on the set of input data. In some examples, the support systems 1674 only needs to select an appropriate neural network processing engine of the neural network processor. In some examples, the support systems 1674 may need to load the data for the neural network onto the acceleration engine 1660 before the acceleration engine 1660 can start executing the neural network. In these and other examples, the support systems 1674 can further receive the output of executing the neural network, and provide the output back to the host processor 1672.

In some examples, the operations of the support systems 1674 can be handled by the host processor 1672. In these examples, the support systems 1674 may not be needed and can be omitted from the host system 1600.

In various examples, the host system 1600 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1600 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method comprising:
   receiving, by a data processor, a set of machine instructions to execute, wherein the set of machine instructions implements a neural network operation to normalize data elements along columns of an input tensor; and
   executing, by the data processor, the set of machine instructions including:
   executing a transpose-and-compute machine instruction to transpose submatrices of the input tensor in a transpose circuit of a vector compute bank, compute statistical values on column elements of the submatrices being streamed into compute channels of the vector compute bank, and store the statistical values in a set of row partitions of a memory for the vector compute bank; and
   executing a scaling machine instruction to scale data elements of the input tensor being streamed into the compute channels of the vector compute bank based on the statistical values.

2. The computer-implemented method of claim 1, wherein executing the set of machine instructions further includes:
   executing the transpose-and-compute machine instruction in additional vector compute banks;
   executing one or more memory copy instructions to copy statistical values computed by the additional vector compute banks into the set of row partitions; and
   executing an aggregate instruction to aggregate the statistical values computed by the vector compute bank and the additional vector compute banks to generate aggregated statistical values for the columns of the input tensor.

3. The computer-implemented method of claim 1, wherein the statistical values include a mean of the column elements, and a variance of the column elements.

4. The computer-implemented method of claim 3, wherein executing the set of machine instructions further includes executing a machine instruction on an activation engine of the data processor to compute a reciprocal square root from the variance of the column elements.

5. A computer-implemented method comprising:
   retrieving a set of machine instructions from an instruction buffer of a data processor, wherein the instruction buffer includes a plurality of entries, and wherein each entry stores one machine instruction; and
   executing a first machine instruction from the set of machine instructions to transpose a first submatrix of an input tensor and perform first computations on column elements of the first submatrix,
wherein the first machine instruction combines a transpose operation with computational operations into a single machine instruction, and
wherein the first machine instruction is executed concurrently on multiple vector compute banks to operate on different submatrices of the input tensor in parallel.

6. The computer-implemented method of claim 5, further comprising:
executing a second machine instruction from the set of machine instructions to transpose a second submatrix of the input tensor and perform second computations on column elements of the second submatrix.

7. The computer-implemented method of claim 6, wherein the first machine instruction and the second machine instruction are executed on a vector compute bank of a vector compute engine.

8. The computer-implemented method of claim 6, wherein the first machine instruction and the second machine instruction are executed on different vector compute banks of a vector compute engine.

9. The computer-implemented method of claim 6, further comprising:
executing a third machine instruction to aggregate first computational results of the first machine instruction and second computational results of the second machine instruction.

10. The computer-implemented method of claim 9, further comprising:
executing a fourth machine instruction before the third machine instruction to copy the second computational results into a same set of row partitions of a memory as the first computational results.

11. The computer-implemented method of claim 6, wherein the first computations performed on the column elements of the first submatrix includes computing a mean or a variance of the column elements.

12. A data processor comprising:
an instruction buffer operable to store pending machine instructions;
an instruction decoder operable to decode machine instructions stored in the instruction buffer for execution; and
a processing circuit having a plurality of compute channels and operable to execute a machine instruction to transpose a submatrix of an input tensor and perform computations on column elements of the submatrix using respective compute channels,
wherein the machine instruction combines a transpose operation with computational operations including computing a mean or a variance of each column of the submatrix into a single machine instruction.

13. The data processor of claim 12, wherein the machine instruction loads the submatrix from row partitions of a memory into the processing circuit, and stores computational results of the computations to the row partitions of the memory.

14. The data processor of claim 12, wherein the processing circuit includes transpose circuitry that receives elements belonging to a column of the submatrix in parallel, and provides the elements in series to a compute channel.

15. The data processor of claim 12, wherein the input tensor includes multiple submatrices, and the processing circuit is operable to execute the machine instruction for each of the submatrices of the input tensor.

16. The data processor of claim 12, wherein the computations are used to normalize or reduce the input tensor.

17. A non-transitory computer readable medium having stored therein instructions that, when executed by one or more processors, cause the one or more processors to execute a compiler, the compiler performing operations comprising:
receiving a description of a neural network model that contains neural network operations;
identifying a neural network operation in the description of the neural network model that performs computations including computing a mean or a variance on data elements of vectors that are each stored across row partitions of a memory buffer by a previous neural network operation; and
generating a machine instruction that combines a transpose operation with computational operations including computing the mean or the variance to implement the identified neural network operation.

18. The non-transitory computer readable medium of claim 17, wherein
the neural network operation includes a tensor normalization operation.

19. The computer-implemented method of claim 5, wherein the first computations are used to normalize or reduce the input tensor.

20. The data processor of claim 12, wherein the processing circuit includes a plurality of transpose circuits, and wherein the plurality of compute channels are organized into a plurality of compute banks, each of the compute banks being coupled to a corresponding one of the plurality of transpose circuits.

* * * * *